United States Patent
Aratani et al.

(10) Patent No.: US 7,783,443 B2
(45) Date of Patent: Aug. 24, 2010

(54) INFORMATION PROCESSING APPARATUS, INFORMATION PROCESSING METHOD, AND CALIBRATION JIG

(75) Inventors: Shinichi Aratani, Tokyo (JP); Kiyohide Satoh, Kawasaki (JP); Shinji Uchiyama, Yokohama (JP); Daisuke Kotake, Yokohama (JP); Kazuhiko Kobayashi, Yokohama (JP); Rika Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 12/037,489

(22) Filed: Feb. 26, 2008

(65) Prior Publication Data
US 2008/0228434 A1 Sep. 18, 2008

(30) Foreign Application Priority Data
Mar. 15, 2007 (JP) .............................. 2007-067593

(51) Int. Cl.
*G06F 19/00* (2006.01)
*G06K 9/00* (2006.01)
(52) U.S. Cl. .................... 702/94; 702/150; 382/141; 382/291
(58) Field of Classification Search ............ 702/94, 702/150; 382/141, 291
See application file for complete search history.

(56) References Cited

U.S. PATENT DOCUMENTS

| | | | | |
|---|---|---|---|---|
| 6,114,824 A | * | 9/2000 | Watanabe | 318/568.12 |
| 2005/0256395 A1 | * | 11/2005 | Anabuki et al. | 600/414 |
| 2008/0068343 A1 | * | 3/2008 | Hoshino et al. | 345/173 |
| 2008/0161682 A1 | * | 7/2008 | Kendrick et al. | 600/424 |
| 2008/0228422 A1 | * | 9/2008 | Satoh | 702/92 |

* cited by examiner

*Primary Examiner*—Bryan Bui
(74) *Attorney, Agent, or Firm*—Cowan, Liebowitz & Latman, P.C.

(57) ABSTRACT

When a calibration jig (50) which includes an image sensing device (100) is moved within the image sensing range of an image sensing device (200), the image coordinates of an index (110) on the image sensing device (100) in a plurality of images sensed by the image sensing device (200) are extracted. The image coordinates of environment allocation indices (300) in a plurality of images sensed by the image sensing device (100) are extracted. An information processing apparatus (1000) calculates camera parameters of the image sensing device (200) based on the extracted image coordinates of the index (110) and the environment allocation indices (300).

13 Claims, 12 Drawing Sheets

INFORMATION PROCESSING APPARATUS, INFORMATION PROCESSING METHOD, AND CALIBRATION JIG

BACKGROUND OF THE INVENTION

1. Field of the Invention

The present invention relates to a technique for estimating allocation information of an image sensing device and indices allocated on a physical space.

2. Description of the Related Art

As one method of calculating the position and orientation of an image sensing device that moves in a physical space, a method of calculating the position and orientation of an image sensing device based on indices allocated or set on the physical space and an image sensed by the image sensing device is known (see non-patent reference 1). With this method, the image coordinates of the indices in the image sensed by the image sensing device are detected, and the position and orientation of the image sensing device are calculated using the correspondence between the detected image coordinates of the indices and their three-dimensional (3D) coordinates.

However, the method of calculating the position and orientation of an image sensing device using only indices on the physical space can no longer calculate those of the image sensing device when the indices are occluded by obstacles or when they have poor visibility. Hence, the following robust method has been proposed (see non-patent reference 2). That is, indices are attached to the image sensing device itself as an object to be measured, and are externally sensed using a plurality of other image sensing devices set on a ceiling or the like, and measurement is made using images sensed by these image sensing devices together. Each image sensing device which externally senses an image of the object to be measured (the image sensing device in this case) will be referred to as an objective viewpoint camera hereinafter.

In the aforementioned measurement method, the position and orientation of each index (to be referred to as allocation information of each index hereinafter) on a 3D coordinate system as a reference for measurement (to be referred to as a reference coordinate system hereinafter) need be calculated in advance. The reference coordinate system is defined to have one point on the physical space as an origin, and three axes which are orthogonal to each other at this origin as X-, Y-, and Z-axes. The position and orientation of each objective viewpoint camera on the reference coordinate system, and parameters unique to the camera such as the distortion characteristics, focal length, image center, and the like need be calculated in advance. The position and orientation of each camera will be referred to as the allocation information of each camera or camera extrinsic parameters hereinafter. Also, the parameters unique to each camera such as the focal length, image center, and the like will be referred to as camera intrinsic parameters hereinafter.

An operation or process of acquiring the allocation information of each index will be referred to as calibration of each index hereinafter. The calibration of each index can be attained by a manual measurement using a ruler, protractor, surveying jig, and the like. However, the manual measurement suffers problems such as much labor and poor precision. For this reason, each index is conventionally calibrated using image information by a simple method with high precision.

The allocation information of an index whose allocation information is expressed by the position of one point on the physical space (to be referred to as a point index hereinafter) can be calculated by a bundle adjustment method (see non-patent reference 3). The bundle adjustment method simultaneously calculates the positions of points on the physical space and the position and orientation of the image sensing device upon sensing each sensed image based on a large number of images sensed from various directions. More specifically, this method optimizes the positions of points and the position and orientation of the image sensing device so as to minimize the sum of errors between the positions of points observed on the sensed image and those of the points on an image calculated from the positions of the points and the position and orientation of the image sensing device.

On the other hand, in case of an index (to be referred to as a 2D index hereinafter) whose allocation information is expressed by the position and orientation on the reference coordinate system like an index having a two-dimensional shape such as a square or the like, the aforementioned method of calculating the positions of points cannot be directly applied. Hence, non-patent reference 4 discloses a method of calculating the allocation information of the 2D index and point index by the same method as the bundle adjustment method. In order to measure the allocation information of each index on the reference coordinate system, pieces of allocation information of some indices on the reference coordinate system must be given. An index whose allocation information on the reference coordinate system is given will be referred to as a reference index hereinafter. The reference coordinate system may be defined by these reference indices. Respective indices to be calibrated must be sensed to be linked together from the reference indices.

Note that "sensed to be linked together from the reference indices" indicates, for example, the following situation. That is, the reference indices and index A are simultaneously sensed on some images, and indices A and B are simultaneously sensed on some other images. Also, index B and other indices are simultaneously sensed on still other images. In this manner, "sensed to be linked together from the reference indices" indicates the situation in which the relationships among the reference indices and other indices can be derived by following data.

On the other hand, a process of calculating the allocation information of the camera and the parameters unique to the camera such as the focal length, image center, and the like is called camera calibration (see non-patent reference 5). In general, the camera calibration is implemented by observing a plurality of points whose positions on a 3D coordinate system are known. This requires a special reference object for calibration such as an elaborated 3D reference object or the like. Also, a method of implementing calibration using a reference plane on which points whose 2D positions are known are drawn is known (see non-patent reference 6).

In the field of photogrammetry, calculating the camera intrinsic parameters is called an interior orientation, and calculating the camera extrinsic parameters is called an exterior orientation. The interior orientation may be separately done using a calibration board or the like before the exterior orientation, or may be done simultaneously with the exterior orientation. The exterior orientation is classified into a relative orientation and absolute orientation. Calculating the relative relationship among the positions and orientations of a camera sensed at a plurality of viewpoints is called a relative orientation. Calculating the position and orientation of a camera on the reference coordinate system is called an absolute orientation. The information of the position and orientation of a camera calculated by the relative orientation corresponds to a relative relationship between cameras, and represents the position and orientation of each camera on a temporary coordinate system different from the reference coordinate system.

A case will be examined below wherein a large number of objective viewpoint cameras are fixed to the ceiling of a building or the like over a broad range, and they are to be calibrated. A simplest implementation method based on the related arts is a method of individually executing the absolute orientation of each camera without any relative orientation. For this purpose, a reference object that specifies the reference coordinate system can be sensed by each individual camera.

Also, in another method, after the relative relationship between the cameras is calculated by the relative orientation, the absolute orientations of respective cameras are simultaneously determined by calculating the transformation between the temporary coordinate system of the relative orientation and the reference coordinate system. In this case, by simultaneously observing a reference object which has no relation to the relative coordinate system by a plurality of cameras, the interior orientation and relative orientation are simultaneously executed. Next, by observing another reference object that specifies the reference coordinate system by one or more cameras, the absolute orientation is executed. Note that it is a common practice to individually execute the interior orientation of each individual camera prior to setting of the cameras, and to execute the relative orientation and absolute orientation in turn after the cameras are set.

As described above, with any method described above, the absolute orientation of an objective viewpoint camera is implemented by observing the "reference object that specifies the reference coordinate system". Note that the reference object that specifies the reference coordinate system gives a set of points (reference points) whose positions on the reference coordinate system are known. Such an object is formed by allocating, on the physical space, a plurality of indices (reference indices) each of which has known allocation information on the reference coordinate system. The precision of the absolute orientation largely depends on the distributions of the reference points in the images and space to be observed. That is, if the distribution of the reference points to be observed is sufficient, the absolute orientation with a sufficiently high precision can be executed.

[Non-Patent Reference 1]

Sato, Uchiyama, and Tamura: "Registration method in mixed reality", Transactions of the Virtual Reality Society of Japan, vol. 8, no. 2, pp. 171-180, 2003.

[Non-Patent Reference 2]

Sato, Uchiyama, and Yamamoto: "UG+B method: A Registration Framework Using Subjective and Objective Viewpoint Cameras, and Orientation Sensor", Transactions of the Virtual Reality Society of Japan, vol. 10, no. 3, pp. 391-400, 2005.

[Non-Patent Reference 3]

The Japan Society of Photogrammetry and Remote Sensing, "Analytic Photogrammetry, Revised edition", 1989.

[Non-Patent Reference 4]

Kotake, Uchiyama, and Yamamoto: "A Marker Calibration Method Utilizing A Priori Knowledge on Marker Arrangement", Transactions of the Virtual Reality Society of Japan, vol. 10, no. 3, pp. 401-410, 2005.

[Non-Patent Reference 5]

Ueshiba, Okatani, and Sato: "Camera Calibration", IPSJ SIG Notes, 2005-CVIM-148(1).

[Non-Patent Reference 6]

Z. Zhang: "Flexible Camera Calibration by Viewing a Plane from Unknown Orientations," Proc. 7th Int'l Conf. on Computer Vision (ICCV'99), Vol. 1, pp. 666-673, 1999.

[Non-Patent Reference 7]

Kato, M. Billinghurst, Asano, and Tachibana: "An Augmented Reality System and its Calibration based on Marker Tracking", Transactions of the Virtual Reality Society of Japan, vol. 4, no. 4, pp. 607-616, 1999.

[Non-Patent Reference 8]

Junichi Rekimoto: "A Method of Constructing of Augmented Reality using the 2D matrix code", Interactive System and Software V, Kindai Kagaku sha, 1997.

[Non-Patent Reference 9]

G. Klein and T. Drummond: "Robust Virtual Tracking for Non-instrumented Augmented Reality," Proc. International Symposium on Mixed Reality and Augmented Reality (ISMAR'03), pp. 113-122, 2003.

[Non-Patent Reference 10]

Jun Sato: "Computervision—Geometry of Vision—", Corona Publishing, Co., Ltd., 1999.

[Non-Patent Reference 11]

Tomasi, C. and Kanade, T.: "Shape and motion from image streams under orthography: A factorization method," International Journal on Computer Vision, vol. 9, no. 2, pp. 137-154.

However, if both objective viewpoint cameras and reference indices are fixed on the physical space, it is not always easy to acquire reference points required for the absolute orientation with high precision. If a sufficient number of reference indices cannot be allocated within the image sensing range of each objective viewpoint camera, the absolute orientation of the objective viewpoint camera cannot be precisely executed. However, since the fixed objective viewpoint camera has a limited image sensing range, it can only sense images of limited reference indices. For this reason, reference indices need be additionally allocated within the range that the objective viewpoint camera can sense. However, a sufficient number of reference indices cannot often be allocated due to physical constraints. The reference points desirably have a 3D distribution. However, the reference indices can be allocated only on the floor surface and wall surface in practice, and such limited allocations of the reference indices cause a drop in the precision of the absolute orientation. It is possible to sense images of a 3D calibration jig on which reference points are allocated while moving that jig to prescribed positions. However, such an image sensing process requires a lot of labor and the allocation precision of the jig poses another problem.

Conventionally, the relative orientation and absolute orientation in the camera calibration are independent processes, and require much labor. In addition, since the camera calibration and index calibration are executed as independent processes, and require much labor.

Upon calibration of indices allocated on the physical space, if there is an index allocated at a position where that index cannot be sensed to be linked together from the reference index, the allocation information of this index on the reference coordinate system cannot be calculated. Thus, the allocation positions of indices are limited, and indices must be allocated with excessively more density.

As described above, it is required to execute the calibration of objective viewpoint cameras and indices more simply and precisely.

SUMMARY OF THE INVENTION

The present invention has been made in consideration of the aforementioned problems, and has as its object to integrate the relative orientation and absolute orientation processes in the camera calibration.

It is another object of the present invention to attain an absolute orientation with high precision even when a sufficient number of reference points (reference indices) cannot be fixedly allocated within the image sensing range of each objective viewpoint camera.

It is still another object of the present invention to integrate the processes for calculating the allocation information of each index allocated on the physical space and that of each objective viewpoint camera. It is yet another object of the present invention to implement calibration of an index which is allocated at a position where that index cannot be sensed to be linked together from the reference index.

According to one aspect of the present invention, an information processing apparatus comprises:

- a first acquisition unit adapted to acquire, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
- a first extraction unit adapted to extract image coordinates of the first index from each of the first images to acquire the image coordinates of the first index at the plurality of times;
- a second acquisition unit adapted to acquire a plurality of second images sensed by the second image sensing device at the plurality of times;
- a second extraction unit adapted to extract image coordinates of the second index from each of the second images to acquire the image coordinates of the second index at the plurality of times; and
- a calculation unit adapted to calculate a position of the second index by using simultaneously the image coordinates of the first index and the second index at the plurality of times, which are respectively extracted by the first extraction unit and the second extraction unit.

According to another aspect of the present invention, an information processing apparatus comprises:

- a first acquisition unit adapted to acquire, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
- a first extraction unit adapted to extract image coordinates of the first index from each of the first images to acquire the image coordinates of the first index at the plurality of times;
- a second acquisition unit adapted to acquire a plurality of second images sensed by the second image sensing device at the plurality of times;
- a second extraction unit adapted to extract image coordinates of the second index from each of the second images to acquire the image coordinates of the second index at the plurality of times; and
- a calculation unit adapted to calculate a camera parameter of the first image sensing device by using simultaneously the image coordinates of the first index and the second index at the plurality of times, which are respectively extracted by the first extraction unit and the second extraction unit.

According to still another aspect of the present invention, a calibration jig which is provided on a physical space as an object to be sensed by a camera which is fixed in position in order to calculate a camera parameter of the camera, comprises:

- at least one image sensing device adapted to sense the physical space, and
- at least one marker adapted to be observed by the camera.

According to yet another aspect of the present invention, an information processing method comprises:

- a first acquisition step of acquiring, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
- a first extraction step of extracting image coordinates of the first index from each of the first images to acquire the image coordinates of the first index at the plurality of times;
- a second acquisition step of acquiring a plurality of second images sensed by the second image sensing device at the plurality of times;
- a second extraction step of extracting image coordinates of the second index from each of the second images to acquire the image coordinates of the second index at the plurality of times; and
- a calculation step of calculating a camera parameter of the first image sensing device by using simultaneously the image coordinates of the first index and the second index at the plurality of times, which are respectively extracted in the first extraction step and the second extraction step.

According to still yet another aspect of the present invention, an information processing method comprises:

- a first acquisition step of acquiring, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
- a first extraction step of extracting image coordinates of the first index from each of the first images to acquire the image coordinates of the first index at the plurality of times;
- a second acquisition step of acquiring a plurality of second images sensed by the second image sensing device at the plurality of times;
- a second extraction step of extracting image coordinates of the second index from each of the second images to acquire the image coordinates of the second index at the plurality of times; and
- a calculation step of calculating a position of the second index by using simultaneously the image coordinates of the first index and the second index at the plurality of times, which are respectively extracted in the first extraction step and the second extraction step.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

First Embodiment

Figure 1:
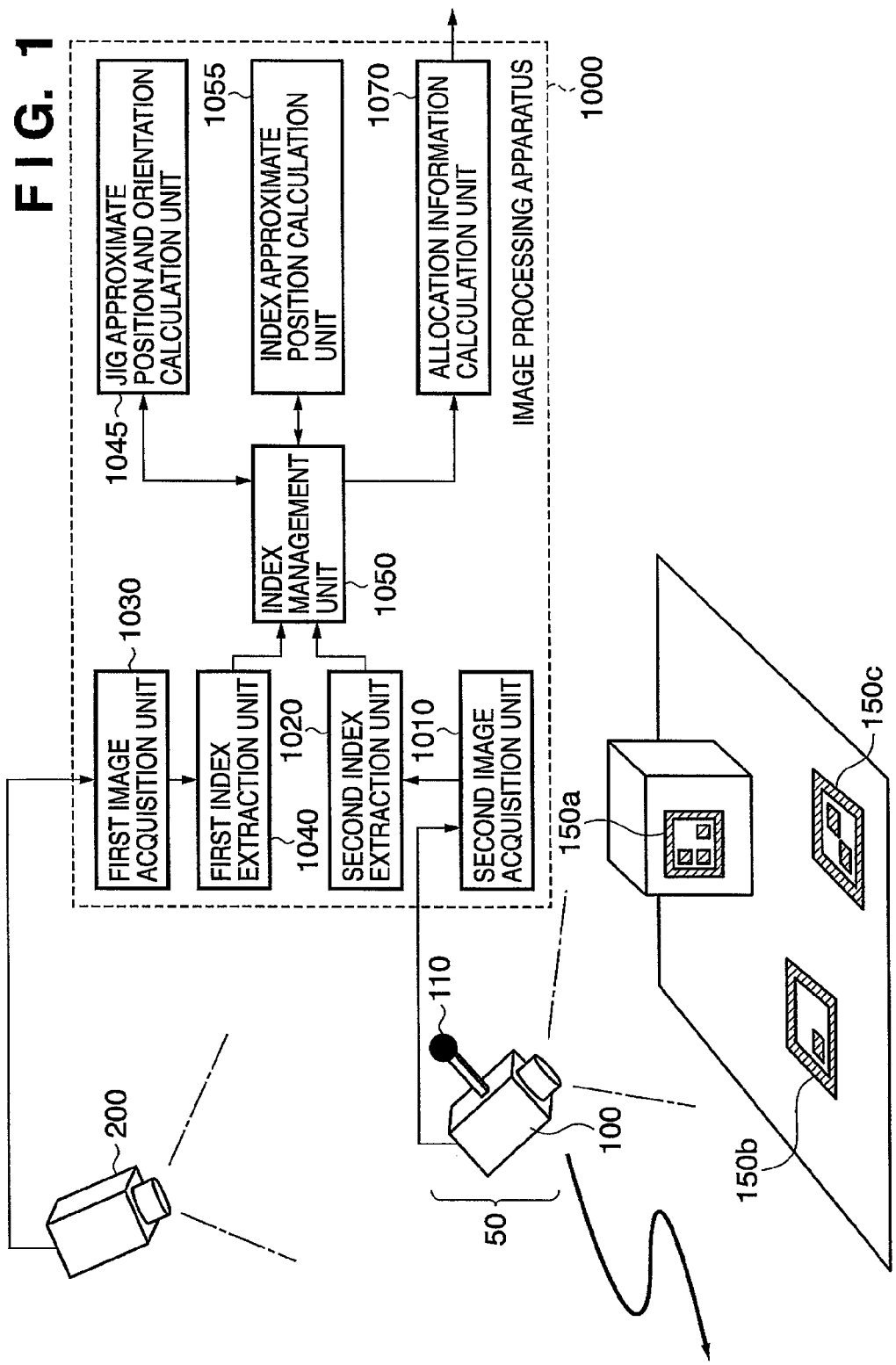
FIG. 1 is a block diagram showing the functional arrangement of a system according to a first embodiment of the present invention, which is used to calculate the positions and orientations (pieces of allocation information) of one or more image sensing devices on a reference coordinate system, which are allocated on a physical space.

FIG. 1 is a block diagram showing the functional arrangement of a system according to this embodiment, which is used to calculate the positions and orientations (pieces of allocation information) of one or more image sensing devices on the reference coordinate system, which are allocated on the physical space. That is, this system calculates extrinsic parameters of camera parameters.

To an information processing apparatus 1000, one or more image sensing devices 200 to be calibrated are connected. This embodiment will explain a case in which the information processing apparatus 1000 calculates pieces of allocation information of one or more image sensing devices 200.

Note that FIG. 1 illustrates one image sensing device 200. However, a general description will be given hereinafter under the assumption that a plurality of image sensing devices 200 are connected to the image processing apparatus 1000. In the following description, let j ($j=1, 2, \ldots, N_2$) be an identifier of the image sensing device 200. Note that $N_2$ represents the total number of image sensing devices 200. That is, in this embodiment, $N_2$ image sensing devices 200 are connected to the information processing apparatus 1000. Also, assume that the intrinsic parameters of each image sensing device 200 are known in this embodiment.

Figure 4A:
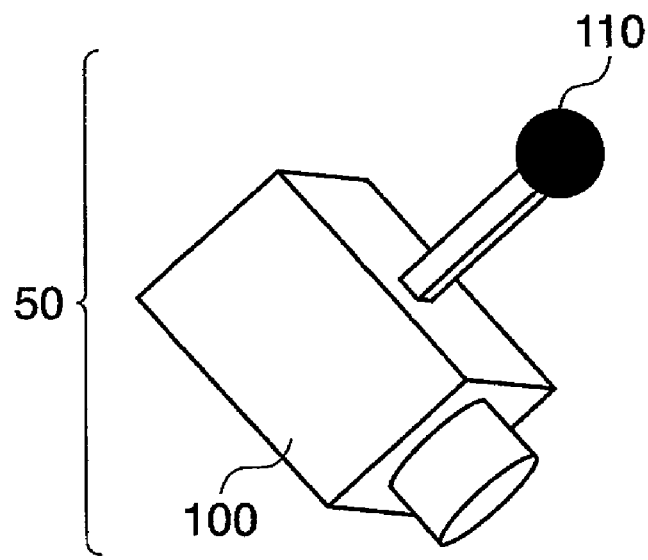
FIG. 4A shows an outer appearance example of a calibration jig 50 according to the first embodiment of the present invention.

A calibration jig 50 is moved by the operator within the image sensing ranges of the image sensing devices 200. The calibration jig 50 according to this embodiment includes one image sensing device 100 and one index 110 added to this image sensing device 100 via a rod member, as shown in FIG. 4A. FIG. 4A shows an outer appearance example of the calibration jig 50 according to this embodiment. Note that the addition form of the index 110 is not particularly limited as long as that index is arranged on the image sensing device (image sensing device 100).

The image sensing device 100 is connected to the information processing apparatus 1000 via a second image acquisition unit 1010 included in the information processing apparatus 1000. The second image acquisition unit 1010 comprises, for example, a video capture card set in a PC. The image sensing device 100 is a video camera which senses a moving image of the physical space where indices 150a to 150c are allocated, and data of respective sensed frame images (physical space images) are input to the second image acquisition unit 1010.

The second image acquisition unit 1010 sequentially outputs the physical space images received from the image sensing device 100 to a second index extraction unit 1020.

The second index extraction unit 1020 extracts environment allocation indices which configure each of the indices 150a to 150c in each physical space image received from the second image acquisition unit 1010. The environment allocation indices will be described below.

Figure 3A:
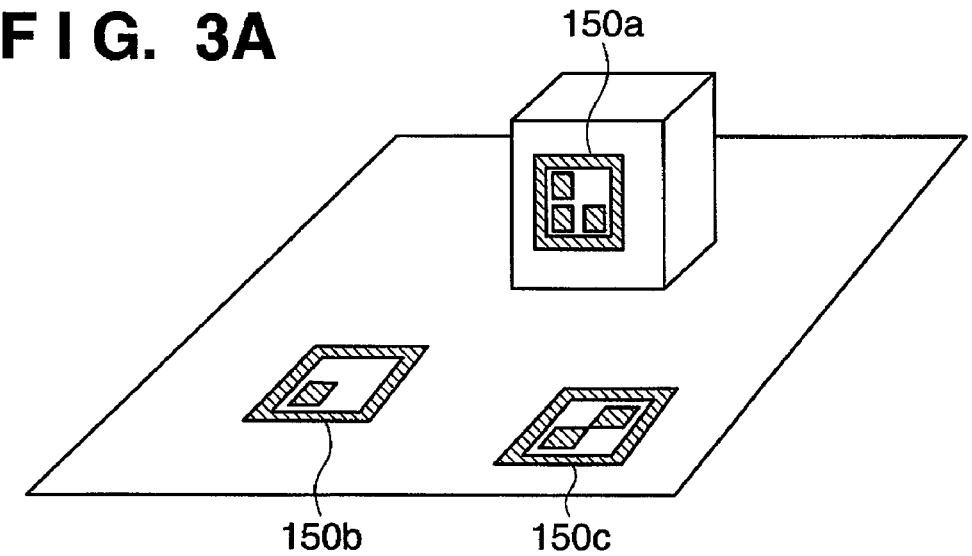
FIG. 3A shows an allocation example of square indices 150a to 150c.

On the physical space (including a physical object that exists on the physical space), the indices 150a to 150c having a square shape (to be referred to as square indices 150a to 150c) are allocated, as shown in FIG. 3A. FIG. 3A shows an allocation example of the square indices 150a to 150c.

Figure 3B:
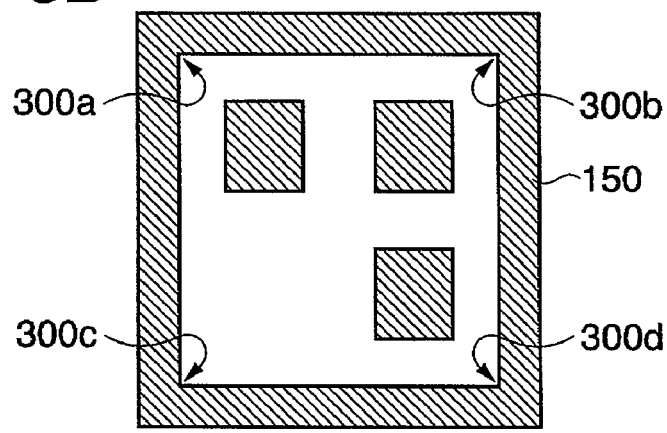
FIG. 3B shows a configuration example of the square indices 150a to 150c.

As shown in FIG. 3B, patterns which represent identifiers of the square indices 150a to 150c are recorded inside these indices 150a to 150c. Therefore, by reading the pattern of a given square index in an image, one of the square indices 150a to 150c is uniquely identified to be this square index. Note that vertices 300a to 300d of one square index will be referred to as environment allocation indices. In the following description, the environment allocation indices 300a to 300d will be collectively referred to as an environment allocation index 300. FIG. 3B shows a configuration example of the square indices 150a to 150c.

Let i ($i=1, 2, \ldots, N_3$) be an identifier of the environment allocation index 300. The position of each environment allocation index 300 on the reference coordinate system is given, and is held in an index management unit 1050 as the allocation information of an index.

The second index extraction unit 1020 applies binarization processing and then labeling processing to each physical space image received from the second image acquisition unit 1010 to extract regions each defined by four straight lines from those with a predetermined area or larger as candidate regions of square indices. Furthermore, the unit 1020 determines if each candidate region is a region of a square index by checking whether or not each extracted candidate region includes a specific pattern. Finally, the unit 1020 reads out the pattern in each region determined as that of a square index to acquire the orientation (direction) and identifier of that square index in the physical space image.

The second index extraction unit 1020 outputs the image coordinates, identifiers, and the like of the environment allocation indices in each physical space image to the index management unit 1050.

Figure 3C:
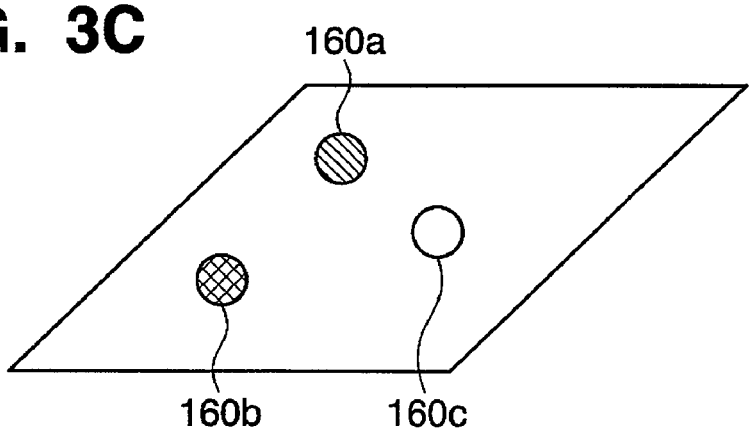
FIG. 3C is a view for explaining point indices.

Note that the environment allocation indices 300 are not limited to the vertices of each square index, and any other forms may be used as long as they can be detected on each physical space image and are identifiable from each other. For example, as shown in FIG. 3C, the environment allocation indices 300 may be point indices 160a to 160c like circular indices having different colors. In this case, regions corresponding to the colors of the respective indices are detected from the physical space image, and their barycentric positions are specified as their detection coordinates (image coordinates). FIG. 3C is a view for explaining point indices.

Also, discriminative points (natural feature points) which respectively have different texture features and originally exist on the physical space may be used as point indices. Various methods for extracting natural feature points from a physical space image are available. For example, by applying template matching using template images of respective indices held in advance as given information to the physical space image, indices can be extracted from the physical space image.

Infrared luminescent markers may be used as the environment allocation indices 300. In this case, as the image sensing device 100, an infrared camera that senses only an infrared wavelength range is used. Alternatively, indices made up of a retroreflection material (retroreflection markers) may be used. In this case, these markers are irradiated with infrared rays from a position near the image sensing device 100, and light reflected by these markers is sensed by an infrared camera. In this way, the use of infrared light allows robust detection. The present invention is not limited to such indices, and any other indices may be used as long as they are fixed on the physical space and are detectable from a sensed image. Of course, a plurality of types of indices may be used together.

Each image sensing device 200 is connected to the image processing apparatus 1000 via a first image acquisition unit 1030 included in the image processing apparatus 1000. The first image acquisition unit 1030 comprises a video capture card set in a PC. The image sensing device 200 is a video camera which senses a moving image of the physical space where the calibration jig 50 is allocated, and data of respective sensed frame images (physical space images) are input to the first image acquisition unit 1030.

When a plurality of image sensing device 200 are equipped over a broad range, the first image acquisition unit 1030 comprises video capture cards set in PCs which are connected via a network such as a LAN (Local Area Network) or the like.

Note that the operator moves the calibration jig 50 within the image sensing range of the image sensing device 200. The index 110 is always sensed by the image sensing device 200.

A first index extraction unit 1040 extracts the index 110 from each physical space image received from the first image acquisition unit 1030.

Note that the index 110 is not particularly limited as long as it is an index directly or indirectly fixed to the calibration jig 50 and can be extracted and identified from each physical space image sensed by the image sensing device 200. Note that the form of the index 110 needs to be changed depending on the type of each image sensing device 200 to be calibrated. For example, if the image sensing device 200 is an infrared camera, it is effective to use an infrared spontaneous emission marker comprising an infrared LED or the like. When infrared light can be emitted from a position near the image sensing device 200, a retroreflection marker made up of a retroreflection material may be used (note that the infrared spontaneous emission marker and retroreflection marker will be referred to as an infrared marker hereinafter). If the image sensing device 200 is a color camera, it is effective to use color markers having distinctive colors. Alternatively, indices having different textures may be used as the index 110. Also, feature points which originally exist on the calibration jig 50 may be used as the index 110.

The position of the index 110 with respect to the calibration jig 50 (i.e., on a coordinate system defined on the calibration jig 50) is known, and is held as the allocation information of the index 110 in the index management unit 1050. In this embodiment, the coordinate system (camera coordinate system) defined on the image sensing device 100 will be referred to as a calibration jig coordinate system hereinafter for the sake of simplicity. When the calibration jig coordinate system is different from the camera coordinate system, the allocation information of the image sensing device 100 on the calibration jig coordinate system may be calculated in advance, and may undergo coordinate transformation.

The index management unit 1050 manages identifiers i and image coordinates of the environment allocation indices 300 extracted by the second index extraction unit 1020 and the image coordinates of the index 110 extracted by the first index extraction unit 1040. As described above, the index management unit 1050 also manages pieces of allocation information of the environment allocation indices 300 on the reference coordinate system, and that of the index 110 on the coordinate system defined on the calibration jig 50, registered in advance as known information. Each piece of information managed by the index management unit 1050 will also be referred to as index information hereinafter.

A jig approximate position and orientation calculation unit 1045 receives the image coordinates of the environment allocation indices 300 extracted by the second index extraction unit 1020 and their allocation information from the index management unit 1050, and calculates the approximate position and orientation of the calibration jig 50. The calculated position and orientation are held in the index management unit 1050.

An index approximate position calculation unit 1055 calculates the approximate position of the index 110 on the reference coordinate system using the allocation information of the index 110 and the approximate position and orientation of the calibration jig 50 held by the index management unit 1050. The calculated approximate position is held in the index management unit 1050 in association with the image coordinates of the index 110.

An allocation information calculation unit 1070 receives data of the image coordinates of the index 110 and environment allocation indices 300, the allocation information of the respective indices, the approximate position of the index 110, the approximate position and orientation of the calibration jig 50, and the like from the index management unit 1050. Then, the unit 1070 calculates pieces of allocation information of the respective image sensing devices 200. The allocation information calculation unit 1070 externally outputs the pieces of calculated allocation information of the image sensing devices 200 as needed.

Figure 2:
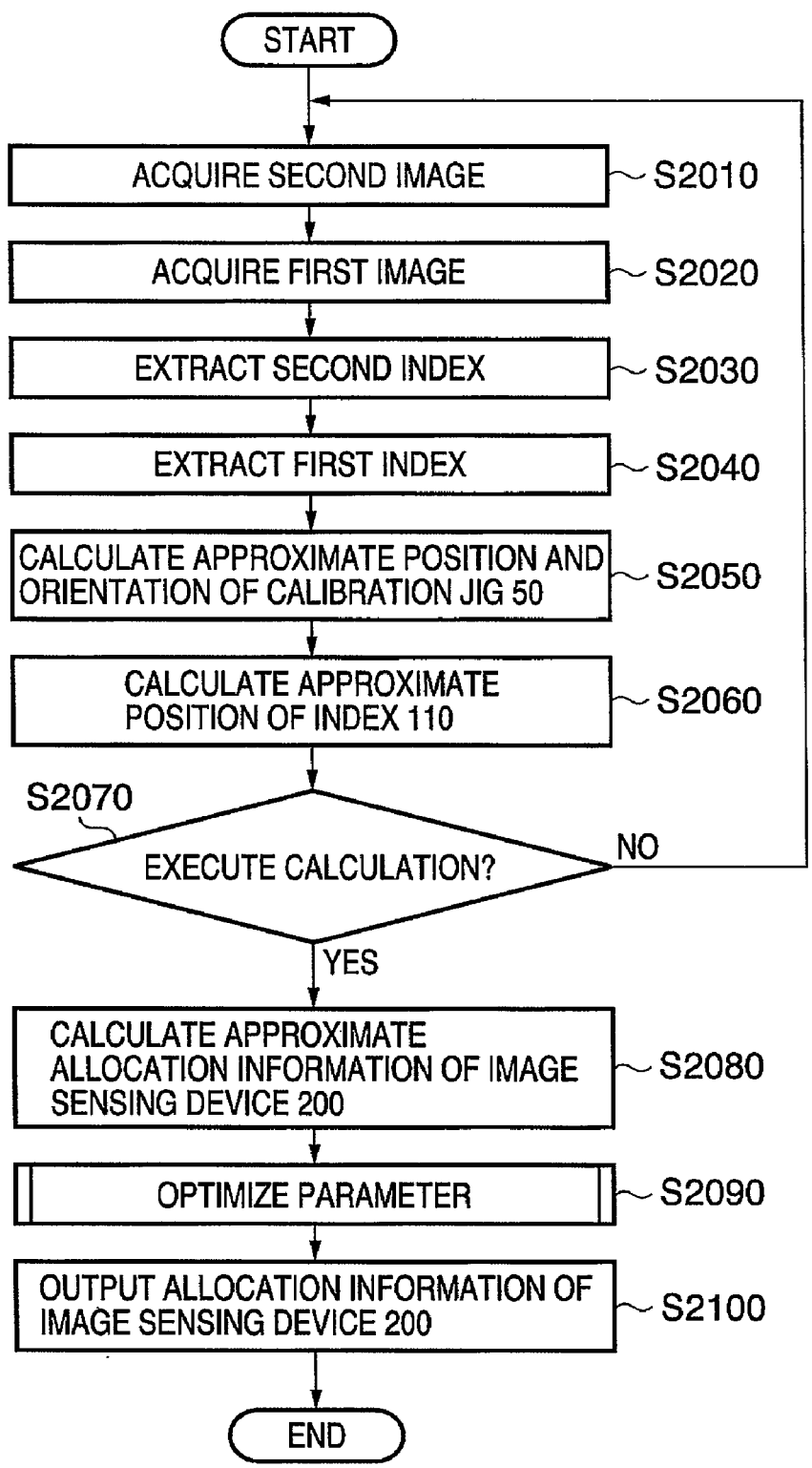
FIG. 2 is a flowchart showing processing executed by an information processing apparatus 1000 to calculate the position and orientation of an image sensing device 200 on the reference coordinate system.

FIG. 2 is a flowchart of the processing executed by the information processing apparatus 1000 to calculate the position and orientation of each image sensing device 200 on the reference coordinate system.

In step S2010, the second image acquisition unit 1010 acquires a physical space image (second image) sensed by the image sensing device 100 at a given time α.

In step S2020, the first image acquisition unit 1030 acquires respective physical space images (first images) sensed by the respective image sensing device 200 at the time α. That is, in this embodiment, since the first and second image acquisition units 1030 and 1010 synchronously execute image acquisition processing, they acquire images at the same time (or at approximately the same time).

In step S2030, the second index extraction unit 1020 extracts the environment allocation indices 300 (second indices) on the second image. The unit 1020 registers image coordinates $\hat{v}_{i\alpha}$ of the extracted environment allocation indices 300 in the index management unit 1050 together with their identifiers i and the time α.

In step S2040, the first index extraction unit 1040 extracts the indices 110 (first indices) on the first images. The unit 1040 registers image coordinates $\hat{u}_{j\alpha}$ of the extracted indices 110 in the index management unit 1050 together with the identifiers j of the image sensing devices 200 and the time α.

In step S2050, the jog approximate position and orientation calculation unit 1045 estimates the approximate position and orientation of the calibration jig 50 on the reference coordinate system at the time α. Since the positions and orientations of the environment allocation indices 300 on the reference coordinate system are known, the unit 1045 calculates the position and orientation of the image sensing device 100 on the reference coordinate system based on the image coordinates of the environment allocation indices 300 extracted in step S2030. This calculation can be implemented using a DLT method (Direct Linear Transformation Method) when the extracted environment allocation indices 300 are not distributed on an identical plane (for example, see non-patent reference 3). On the other hand, the calculation can be implemented using a known method of calculating the position and orientation of a camera using planar homography when the extracted environment allocation indices 300 are distributed on an identical plane (for example, see non-patent references 7 and 8).

Furthermore, when the calibration jig coordinate system is different from the coordinate system of the image sensing device 100, coordinate transformation is executed as needed.

In the following description, the position and orientation of an object are respectively described by 3D vectors $t=[t_x\ t_y\ t_z]^T$ and $\omega=[\omega_x\ \omega_y\ \omega_z]^T$. The position and orientation of an object are described by a six-dimensional (6D) state vector obtained by combining these 3D vectors. Note that an orientation ω is a ternary expression method of an orientation in which the direction of the vector represents a rotation axis, and the magnitude of the vector represents a rotation angle. In the following description, the orientation ω is used by transforming it into, an expression format based on a rotation axis vector $r_{axis}=[r_x\ r_y\ r_z]^T$ and a rotation angle $r_a$, or an expression format based on a 3×3 rotation transformation matrix R, as needed. $r_a$ is expressed using ω by:

$$r_a = \sqrt{\omega_x^2 + \omega_y^2 + \omega_z^2} \quad (1)$$

Also, the relationship between $r_a$ and $r_{axis}$ is expressed by:

$$[\omega_x\ \omega_y\ \omega_z] = [r_a r_x\ r_a r_y\ r_a r_z] \quad (2)$$

The relationship between $r_a$ and R is expressed by:

$$R = \begin{bmatrix} r_x^2(1-\cos r_a)+\cos r_a & r_x r_y(1-\cos r_a)-r_z\sin r_a & r_z r_x(1-\cos r_a)+r_y\sin r_a \\ r_x r_y(1-\cos r_a)+r_z\sin r_a & r_y^2(1-\cos r_a)+\cos r_a & r_y r_z(1-\cos r_a)-r_x\sin r_a \\ r_z r_x(1-\cos r_a)-r_y\sin r_a & r_y r_z(1-\cos r_a)+r_x\sin r_a & r_z^2(1-\cos r_a)+\cos r_a \end{bmatrix} \quad (3)$$

The position and orientation of an object may often be expressed by a 4×4 homogeneous transformation matrix M obtained by combining R and t. In this case, we have:

$$M = \begin{bmatrix} R & t \\ 0 & 1 \end{bmatrix} \quad (4)$$

In the following description, let ψ be the 6D state vector that represents the position and orientation of the calibration jig 50 on the reference coordinate system. Also, let $M_{wc}$ be a transformation matrix which represents the position and orientation of the calibration jig 50 on the reference coordinate system. ψ and $M_{wc}$ are exchangeable. let $ψ_α$ be ψ at the time α, and $M_{wcα}$ be $M_{wc}$ at the time α.

In step S2060, the index approximate position calculation unit 1055 estimates the position of the index 110 extracted in step S2040 on the reference coordinate system at the time α. A position $x_{wα}$ of the index 110 at the time α on the reference coordinate system can be calculated based on the position and orientation $M_{wcα}$ of the calibration jig 50 at the time α calculated in step S2050 and a position $x_c$ of the index 110 with respect to the calibration jig 50 as a known value by:

$$x_{wα} = M_{wcα} x_c \quad (5)$$

where $x_c$ and $x_{wα}$ are expressed by a homogeneous coordinate system.

With the aforementioned processes in steps S2010 to S2060, a set of image coordinates of the index 110 on the physical space image sensed by the corresponding image sensing device 200 at the given time α and the 3D coordinates on the reference coordinate system can be obtained.

In step S2070, the allocation information calculation unit 1070 checks if the data stored in the index management unit 1050 suffice to calculate pieces of allocation information of the respective image sensing devices 200. If it is determined that the currently acquired data suffice, the process advances to step S2080. On the other hand, if it is determined that the acquired data do not suffice, the process returns to step S2010 to execute the processes in steps S2010 to S2060 again. This checking process can be implemented based on a simple criterion indicating whether or not the number of data is equal to or larger than a threshold. Alternatively, information indicating that the distribution of the extracted indices on each image or the distribution of their 3D coordinates on the space is equal to or higher than a threshold may be added as a condition. Alternatively, the user may check whether or not sufficient data are obtained, and may input an instruction by key input.

By repeating the processes in steps S2010 to S2060 while moving the calibration jig 50 to different positions and orientations, data in states in which the index 110 is located at a plurality of coordinates can be obtained. In other words, data at different times α (α=1, 2, ..., $N_1$) can be acquired. Note that $N_1$ represents the number of acquired data.

In step S2080, the allocation information calculation unit 1070 calculates pieces of approximate allocation information of the respective image sensing devices 200 using the sets of image coordinates of the index 110 on the physical space images sensed by these image sensing devices 200, and the 3D coordinate position of the index 110 on the reference coordinate system. This process can be implemented by the DLT method as that in step S2050. In the following description, the allocation information of the image sensing device 200 with an identifier j is expressed by a 6D state vector $s_j$ (j=1, 2, ..., $N_2$).

In step S2090, the allocation information calculation unit 1070 calculates the pieces of allocation information of the respective image sensing devices 200 more precisely by maintaining consistency of the acquired data as a whole. With this processing, the state vector $\psi_\alpha$ indicating the position and orientation of the calibration jig 50 at each time α and the allocation information $s_j$ of each image sensing device 200 are set as variables (unknown parameters). Since approximate values of these parameters have been calculated before step S2080, they are set as initial values. Then, the unit 1070 optimizes these parameters to minimize the sum of residual errors of projection errors on the respective indices (the index 110 and environment allocation indices 300). Details of the process in step S2090 will be described later.

In step S2100, the allocation information calculation unit 1070 outputs the pieces of allocation information of the respective image sensing devices 200 on the reference coordinate system calculated in step S2090.

Figure 5:
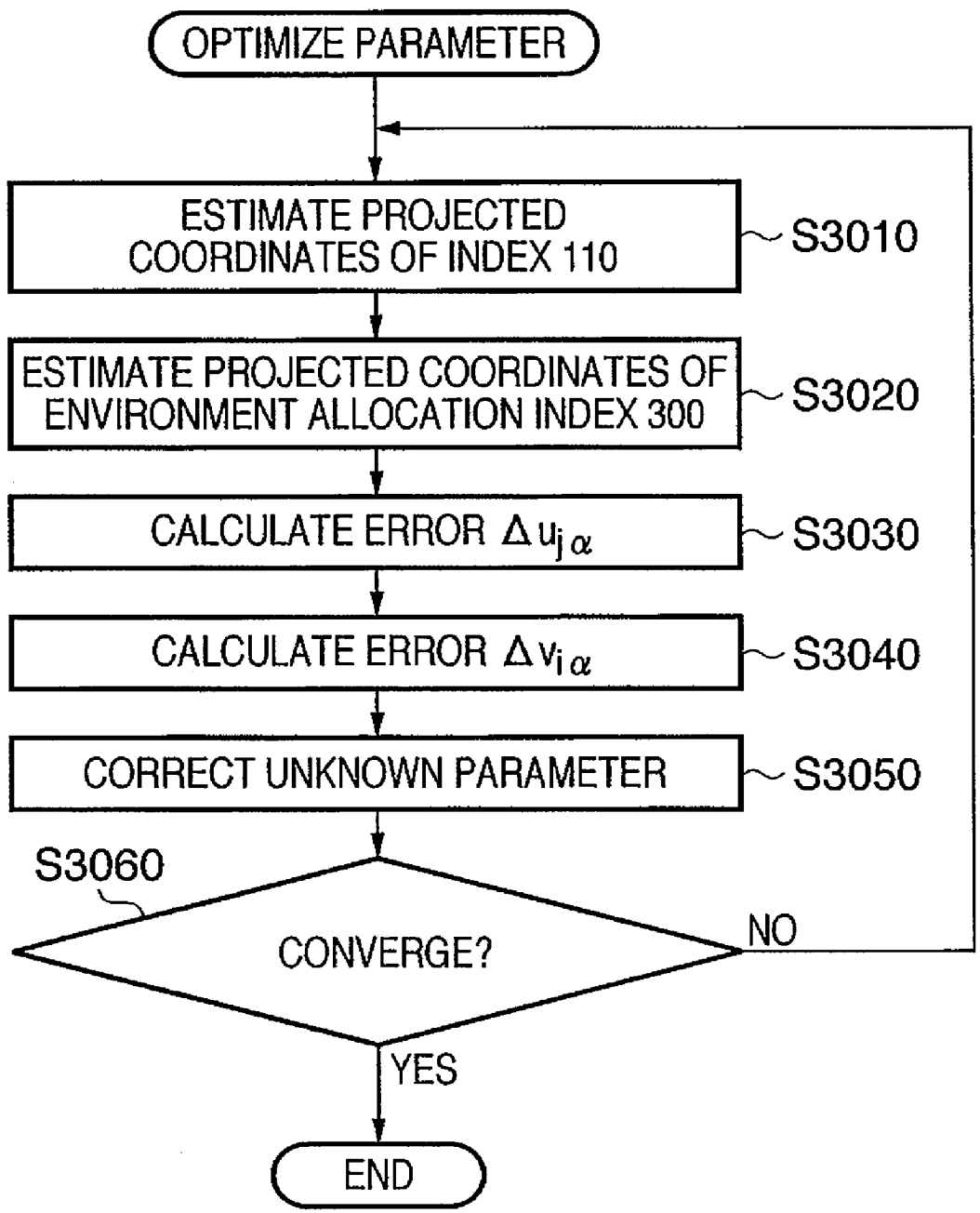
FIG. 5 is a flowchart showing details of the process in step S2090.

Details of the process in step S2090 will be described below with reference to the flowchart shown in FIG. 5. FIG. 5 is a flowchart showing details of the process in step S2090.

In the following description, unknown parameters to be optimized by the process in step S2090 are expressed by $(N_1+N_2) \times 6$ dimensional state vector $t = [s^T \ \psi^T]^T$. Note that $s = [s_1^T \ldots s_{N2}^T]^T$ and $\psi = [\psi_1^T \ldots \psi_{N1}^T]^T$. Also, t0 represents the estimated value of the state vector at the current timing. Also, let $s_{j0}$ be the estimated value of the allocation information of the image sensing device 200 with an identifier j at the current timing, and $\psi_{\alpha 0}$ be the estimated value at the current timing of the position and orientation of the calibration jig 50 at the time α.

In step S3010, the allocation information calculation unit 1070 estimates the projected coordinates (image coordinates) of all the detected indices 110. The calculation of projected coordinate $u_{j\alpha}$ of the index 110 at the time α on the physical space image sensed by the image sensing device 200 with an identifier j is described by:

$$u_{j\alpha} = F_{1j}(s_j, x_{w\alpha}) \quad (6)$$

where $F_{1j}$ is a function which represents the observation equation of the image sensing device 200 with an identifier j, and includes the transformation from the reference coordinate system into the camera coordinate system, and the perspective projection transformation. In step S3010, the allocation information calculation unit 1070 calculates $x_{w\alpha}$ based on current $\psi_{\alpha 0}$ using equation (5). Then, the unit 1070 calculates the projected coordinates $u_{j\alpha}$ based on current $s_{j0}$ using equation (6).

In step S3020, the allocation information calculation unit 1070 estimates the projected coordinates of all the detected environment allocation indices 300. Projected coordinates (image coordinates) $v_{i\alpha}$ of an environment allocation index 300 with an identifier i on the physical space image sensed by the image sensing device 100 at the time α are expressed by:

$$v_{i\alpha} = F_2(\psi_\alpha, a_{wi}) \quad (7)$$

where $F_2$ is a function which represents the observation equation of the image sensing device 100, and includes the transformation from the reference coordinate system into the camera coordinate system, and the perspective projection transformation. The $a_{wi}$ indicates the allocation information (position on the reference coordinate system) of the environment allocation index 300. In this embodiment, the allocation information of each environment allocation index 300 is held as the known value in the index management unit 1050. In step S3020, the allocation information calculation unit 1070 calculates the projected coordinates $v_{i\alpha}$ based on current $\psi_{\alpha 0}$ using equation (7). When the calibration jig coordinate system is different from the coordinate system of the image sensing device 100, their offset need only be considered in the transformation from the reference coordinate system into the camera coordinate system in the observation equation of equation (7).

In step S3030, the allocation information calculation unit 1070 calculates errors (projection errors) $\Delta u_{j\alpha}$ between the projected coordinates $u_{j\alpha}$ of the indices 110 calculated in step S3010 and the image coordinates $\hat{u}_{j\alpha}$ of the indices 110 extracted in step S2040 by:

$$\Delta u_{j\alpha} = u_{j\alpha} - \hat{u}_{j\alpha} \quad (8)$$

In the following description, let n be a serial number assigned to "observation of the index 110 by the respective image sensing devices 200 at all times". Let $N_4$ be the sum of total numbers of times of detection of the index 110 by the respective image sensing devices 200 (i.e., n=1, ..., $N_4$). In the following description, the projection error of an n-th point is expressed by $\Delta u_n = -\Delta u_{j\alpha}$.

In step S3040, the allocation information calculation unit 1070 calculates projection errors $\Delta v_{i\alpha}$ between the projected coordinates $v_{i\alpha}$ of the environment allocation indices 300 calculated in step S3020 and the image coordinates $\hat{v}_{i\alpha}$ of the environment allocation indices 300 extracted in step S2030 by:

$$\Delta v_{i\alpha} = v_{i\alpha} - \hat{v}_{i\alpha} \quad (9)$$

In the following description, let ξ be a serial number assigned to "observation of each individual environment allocation index 300 by the image sensing device 100 at all times". Also, let $N_5$ be the total number (gross number) of environment allocation indices 300 detected on all the images sensed by the image sensing device 100 (i.e., ξ=1, ..., $N_5$). In the following description, the projection error of a ξ-th point is expressed by $\Delta v_\xi = -\Delta v_{i\alpha}$.

In step S3050, the allocation information calculation unit 1070 corrects the state vector t so as to minimize the projection errors calculated in steps S3030 and S3040.

Derivation of a simultaneous equation (equation (20) to be described later) required to calculate a correction value will be described first.

The position $x_{w\alpha}$ of the index 110 on the reference coordinate system at the time α is a function of $\psi_\alpha$, as given by equation (5). Therefore, equation (8) can be rewritten as a function of $s_j$ and $\psi_\alpha$:

$$\Delta u_{j\alpha} = E_{1j}(s_j, \psi_\alpha) \quad (10)$$

Likewise, equation (9) can be rewritten as a function of $\psi_\alpha$:

$$\Delta v_{i\alpha} = E_{2i}(\psi_\alpha) \quad (11)$$

The projection errors $\Delta u_{j\alpha}$ and $\Delta v_{i\alpha}$ are theoretically zero but are not zero in practice since they include errors. The state vector t is estimated based on a nonlinear least square method so as to minimize the sum of projection errors of all observation data, that is, so as to minimize J and H given by:

$$J = \frac{1}{2}\sum_{j=1}^{N_2}\sum_{\alpha \in A_j} E_{1j}(s_j, \psi_\alpha)^2 \quad (12)$$

$$H = \frac{1}{2}\sum_{\alpha=1}^{N_1}\sum_{i \in I_\alpha} E_{2i}(\psi_\alpha)^2 \quad (13)$$

where $A_j$ represents a set of times at which the image sensing device 200 with an identifier j observes (extracts) the index 110. $I_\alpha$ represents a set of environment allocation indices 300 observed (extracted) by the image sensing device 100 at the time $\alpha$.

The method of calculating the state vector t which minimizes J and H may be a Gauss-Newton method, a Levenberg-Marquardt method, or other known optimization methods. For example, the solving method using the Gauss-Newton method will be described below.

By equating the partial derivatives of J given by equation (12) with respect to components $s_{j\gamma}$ and $\psi_{\alpha\eta}$ of $s_j$ and $\psi_\alpha$ to zero, we have:

$$\frac{\partial J}{\partial s_{j\gamma}} = \sum_{j=1}^{N_2}\sum_{\alpha \in A_j} E_{1j}(s_j, \psi_\alpha)\frac{\partial E_{1j}(s_j, \psi_\alpha)}{\partial s_{j\gamma}} = 0 \quad (14)$$

$$\frac{\partial J}{\partial \psi_{\alpha\eta}} = \sum_{j=1}^{N_2}\sum_{\alpha \in A_j} E_{1j}(s_j, \psi_\alpha)\frac{\partial E_{1j}(s_j, \psi_\alpha)}{\partial \psi_{\alpha\eta}} = 0 \quad (15)$$

By equating the partial derivatives of H in equation (13) with respect to components $\psi_{\alpha\eta}$ of $\psi_\alpha$ to zero, we have:

$$\frac{\partial H}{\partial \psi_{\alpha\eta}} = \sum_{\alpha=1}^{N_1}\sum_{i \in I_\alpha} E_{2i}(\psi_\alpha)\frac{\partial E_{2i}(\psi_\alpha)}{\partial \psi_{\alpha\eta}} = 0 \quad (16)$$

The Taylor expansion of equations (9) and (10) yields:

$$E_{1j}(s_j, \psi_\alpha) \approx \quad (17)$$
$$E_{1j}(s_{j0}, \psi_{\alpha 0}) + \left[\frac{\partial E_{1j}(s_{j0}, \psi_{\alpha 0})}{\partial s_j}\right]\Delta s_j + \left[\frac{\partial E_{1j}(s_{j0}, \psi_{\alpha 0})}{\partial \psi_\alpha}\right]\Delta\psi_\alpha$$

$$E_{2i}(\psi_\alpha) \approx E_{2i}(\psi_{\alpha 0}) + \left[\frac{\partial E_{2i}(\psi_{\alpha 0})}{\partial \psi_\alpha}\right]\Delta\psi_\alpha \quad (18)$$

That is, the projection errors can be approximated by linear functions of correction value with respect to respective components of the state vector t.

Partial differential coefficients obtained by partially differentiating $E_{1j}(s_{j0}, \psi_{\alpha 0})$ with respect to respective components of the state vector t are generally expressed by $(N_1+N_2)\times 6$ dimensional vector $J_n$ (n=1, 2, . . . , $N_4$). Partial differential coefficients obtained by partially differentiating $E_{2i}(\psi_{\alpha 0})$ with respect to respective components of the state vector t are generally expressed by $(N_1+N_2)\times 6$ dimensional vector $K_\xi$ ($\xi=1, 2, \ldots, N_5$). Since the partial differential coefficients can be easily derived from the observation equations, a detailed description of their calculation method will be omitted.

Combining the result of substitution of equation (17) to equations (14) and (15) and that of substitution of equation (18) to equation (16) yields simultaneous equation (19) for a correction vector $\Delta$:

$$\begin{bmatrix} J_1 \\ \vdots \\ J_{N_4} \\ K_1 \\ \vdots \\ K_{N_5} \end{bmatrix}^T \begin{bmatrix} J_1 \\ \vdots \\ J_{N_4} \\ K_1 \\ \vdots \\ K_{N_5} \end{bmatrix} \Delta = \begin{bmatrix} J_1 \\ \vdots \\ J_{N_4} \\ K_1 \\ \vdots \\ K_{N_5} \end{bmatrix} \begin{bmatrix} \Delta u_1 \\ \vdots \\ \Delta u_{N_4} \\ \Delta v_1 \\ \vdots \\ \Delta v_{N_5} \end{bmatrix} \quad (19)$$

where $\Delta=[\Delta s_1 \ldots \Delta s_{N2}, \Delta\psi_1 \ldots \Delta\psi_{N1}]^T$, and represents the correction values of the respective parameters of the state vector t. By combining equation (19) using a Jacobian matrix $J=[\Delta J_1 \ldots \Delta J_{N4}, \Delta K_1 \ldots \Delta K_{N5}]^T$ and an error vector $E=[\Delta u_1 \ldots \Delta u_{N4}, \Delta v_1 \ldots \Delta v_{N5}]^T$, following equation can be obtained.

$$J^T J\Delta = J^T E \quad (20)$$

In step S3050, the allocation information calculation unit 1070 calculates the correction vector $\Delta$ by solving the aforementioned simultaneous equation. The solving method of the simultaneous equation may use a discharge method, Gauss-Jordan method, conjugate gradient method, and other known solving methods of the simultaneous equation. When many images are acquired or when many indices are detected, high-speed calculations can be made by, for example, the conjugate gradient method with a pre-process that computes the incomplete Cholesky decomposition in the pre-process.

In step S3050, the allocation information calculation unit 1070 further corrects, using the calculated correction vector $\Delta$, the current state vector $t_0$ according to:

$$t_0 + \Delta \to t \quad (21)$$

The unit 1070 sets the obtained vector as a new state vector t.

The allocation information calculation unit 1070 checks in step S3060 if calculations converge using some criteria such as whether or not the error vector E is smaller than a predetermined threshold or whether or not the correction vector $\Delta$ is smaller than a predetermined threshold. If calculations converge, the process in step S2090 ends, and advances to step S2100. On the other hand, if calculations do not converge, the process returns to step S3010 to repeat the processes in steps S3010 to S3050. At this time, the unit 1070 uses the corrected state vector t corrected in step S3050 as the next $t_0$.

As described above, according to this embodiment, the position and orientation of each image sensing device 200 on the reference coordinate system, that is, the allocation information of that image sensing device 200 can be calculated. In this way, the process for calculating the relative relationship between a reference object and the camera, and the process for transforming it onto the reference coordinate system can be integrated, thus simplifying the processing.

Since the image sensing device 100 need only sense the environment allocation indices 300 allocated on the physical space, indices which define the reference coordinate system need not to be allocated within the image sensing range of the objective viewpoint camera. In this manner, limitations on the allocation method of indices to be allocated on the physical space can be eliminated.

Since the observation information of the environment allocation indices 300 by the image sensing device 100 is used as the constraint condition of the optimization calculations (step S2090), the precision of the allocation information of each image sensing device 200 to be estimated can be improved.

<Modification 1-1>

In the first embodiment, the intrinsic parameters of each image sensing device 200 are known, and only the allocation information of the image sensing device 200 is calculated. However, the intrinsic parameters of each image sensing device 200 may be calculated simultaneously with its allocation information. In this case, intrinsic parameters $a_j$ may be added to the vector $s_j$ that represents unknown parameters associated with the image sensing device 200 with an identifier j in addition to the six parameters which represent the allocation information of that image sensing device 200.

The intrinsic parameters $a_j$ include, for example, a focal length f, coordinates ($u_0$, $v_0$) of the image center, scale factors $k_u$ and $k_v$ in the x- and y-axis directions, and shearing coefficient $k_s$. With these parameters, a matrix A that represents the perspective projection transformation for transforming a point $x_c$ on the camera coordinate system to image coordinates u is expressed by:

$$A = \begin{bmatrix} fk_u & fk_s & u_0 \\ 0 & fk_v & v_0 \\ 0 & 0 & 1 \end{bmatrix} \quad (22)$$

That is, the observation equation of equation (6) in step S2090 can be modified to a form that considers the perspective projection transformation of equation (22). In this way, the intrinsic parameters of each image sensing device 200 are added as unknown parameters, and parameters that minimize the projection errors of indices can be calculated by nonlinear optimization. Note that approximate intrinsic parameters of each image sensing device 200 used as initial values can be calculated together with approximate allocation information by a known method in step S2080. Alternatively, the initial values may be set in advance based on design parameters.

<Modification 1-2>

In the first embodiment, by optimizing the position and orientation ψ of the calibration jig 50 together in step S2090, the precision of the approximate allocation information of each image sensing device 200 calculated in step S2080 is improved. However, the process in step S2090 is not indispensable. That is, the allocation information of each image sensing device 200 calculated in step S2080 may be output intact in step S2100. For example, when the image sensing device 100 is a high-resolution camera or the like, ψ calculated in step S2050 has high reliability. In this way, when ψ with high reliability can be calculated, the process in step S2090 may be omitted.

<Modification 1-3>

In the first embodiment, indices expressed by points on the physical space and physical space images are used as the index 110 and environment allocation indices 300. However, the form of indices is not limited to them, and edges which are detected on the physical space image and cause a change in luminance may be used as indices.

Non-patent reference 9 has proposed a method of measuring the position and orientation of an image sensing device using edge information. With this method, a model such as a CAD model is prepared, and the position and orientation of a camera are calculated by fitting the edges of the model to those on an image. That is, the method of calculating the position and orientation of a camera by fitting the edges of the model to those on an image in this method may be used.

In this case, an edge model of an object fixed on the calibration jig 50 or of the calibration jig 50, and an edge model of an object fixed on the physical space are prepared in advance. Next, the position and orientation of the image sensing device 100 are calculated using the edges of the object fixed on the physical space, which are detected on the physical space image sensed by the image sensing device 100. Since the position and orientation of the image sensing device 100 can be calculated, the position and orientation of the object fixed on the calibration jig 50 or the calibration jig 50 on the reference coordinate system can also be calculated. Finally, using the edges of the object fixed on the calibration jig 50 or those of the calibration jig 50, which are detected on the physical space image sensed by each image sensing device 200, the allocation information of that image sensing device 200 can be calculated.

The function that expresses errors between the projected coordinates and extracted coordinates of the index 110 in equation (12) is replaced by a function that expresses errors between edges obtained by projecting the edge model on the calibration jig 50 onto an image and those detected on the image sensed by the image sensing device 200. Also, the function that expresses errors between the projected coordinates and extracted coordinates of the environment allocation indices 300 in equation (13) is replaced by a function that represents errors between the edges obtained by projecting the edge model of the object fixed on the physical space onto an image, and those detected on the physical space image sensed by the image sensing device 100.

A matrix that combines partial differential coefficients can also be calculated from the observation equations corresponding to edges. In this manner, the allocation information of each image sensing device 200 can be calculated by applying a nonlinear optimization method when edges are used as in the nonlinear optimization method using indices.

<Modification 1-4>

In the first embodiment, the intrinsic parameters of the image sensing device 100 are known. However, the intrinsic parameters of the image sensing devices 100 may be calculated simultaneously with its position and orientation information. In this case, as unknown parameters associated with the image sensing device 100, intrinsic parameters b of the image sensing device 100 may be added to the vector $\psi_\alpha$ that represents the position and orientation at the time α.

The intrinsic parameters b include, for example, a focal length f, coordinates ($u_0$, $v_0$) of the image center, scale factors $k_u$ and $k_v$ in the x- and y-axis directions, and shearing coefficient $k_s$. With these parameters, a matrix $A_{100}$ that represents the perspective projection transformation for transforming a point $x_c$ on the camera coordinate system to image coordinates u is expressed by:

$$A_{100} = \begin{bmatrix} fk_u & fk_s & u_0 \\ 0 & fk_v & v_0 \\ 0 & 0 & 1 \end{bmatrix} \quad (23)$$

That is, the observation equation of equation (7) in step S2090 can be modified to a form that considers the perspective projection transformation of equation (23). In this way, the intrinsic parameters of the image sensing device 100 are added as unknown parameters, and parameters that minimize the projection errors of indices can be calculated by nonlinear optimization. Note that approximate intrinsic parameters of each image sensing device 100 used as initial values can be calculated together with approximate allocation information by a known method. Alternatively, the initial values may be set in advance based on design parameters.

<Modification 1-5>

In the first embodiment, the approximate allocation information of each image sensing device 200 is individually calculated by the allocation information calculation unit 1070 based on the correspondence between the 3D coordinates of the index 110 on the reference coordinate system and its image coordinates (step S2080). However, the method of calculating the approximate allocation information of the image sensing device 200 is not limited to this, and other methods may be used.

For example, projective reconstruction is made using the correspondence of the indices 110 between the image sensing devices 200, and the approximate allocation information of each image sensing device 200 may be calculated based on this result. Based on the correspondence of the indices 110 among images, a relative allocation relationship (an allocation on a given temporary coordinate system) between each image sensing device 200 and the respective indices 110 (at different times α) is estimated based on the projective reconstruction (see non-patent references 5 and 10 for details). Based on the correspondence between the coordinates of the index 110 on the temporary coordinate system obtained as a result of the previous process and those of the index 110 on the reference coordinate system obtained in step S2060, a transformation matrix from the temporary coordinate system to the reference coordinate system is calculated. Finally, using the calculated transformation matrix, the approximate allocation information of each image sensing device 200 on the reference coordinate system can be calculated.

A fundamental matrix between viewpoints may be calculated by exploiting the correspondence of the indices 110 between the two image sensing devices 200, and the approximate allocation information of these image sensing devices 200 may be calculated based on this matrix. Since the relative allocation relationship between the two image sensing devices and the indices 110 can be calculated from the calculated fundamental matrix, the approximate allocation information can be calculated in the same manner as described above.

<Modification 1-6>

In the first embodiment, the allocation information ($x_c$ in equation (5)) of the index 110 with respect to the calibration jig 50 is known. However, the allocation information $x_c$ of the index 110 with respect to the calibration jig 50 may be unknown, and $x_c$ is calculated as one of unknown parameters in this case.

The approximate allocation information (an initial value of $x_c$) of the index 110 with respect to the calibration jig 50 is calculated in advance by an arbitrary method. Alternatively, the origin of the calibration jig coordinate system may be used as an initial value. Then, as in other parameters of the first embodiment, $x_c$ is calculated by repetitively correcting the approximate allocation information by the nonlinear optimization method.

Assume that the allocation information $x_c$ of the index 110 with respect to the calibration jig 50, the position and orientation $\psi_\alpha$ of the calibration jig 50 at each time α, and the allocation information $s_j$ of each image sensing device 200 are used as unknown parameters. That is, the state vector $t = [s^T, \psi^T, x_c^T]^T$. At this time, equation (12) in the first embodiment is modified as:

$$J = \frac{1}{2} \sum_{j=1}^{N_2} \sum_{\alpha \in A} E_{1j}(s_j, \psi_\alpha, x_c)^2 \tag{24}$$

Using modified equation (24), nonlinear optimization can be implemented like in step S3050 of the first embodiment.

Second Embodiment

In the first embodiment, all pieces of allocation information of the environment allocation indices 300 are known, and pieces of allocation information of one or more image sensing devices 200 fixed on the physical space are calculated. In this embodiment, when the vertices of the square indices 150a to 150c are used as the environment allocation indices 300, and some pieces of allocation information of these indices are unknown, these pieces of the allocation information of the environment allocation indices 300 and the pieces of allocation information of one or more image sensing devices 200 fixed on the physical space are calculated.

Figure 6:
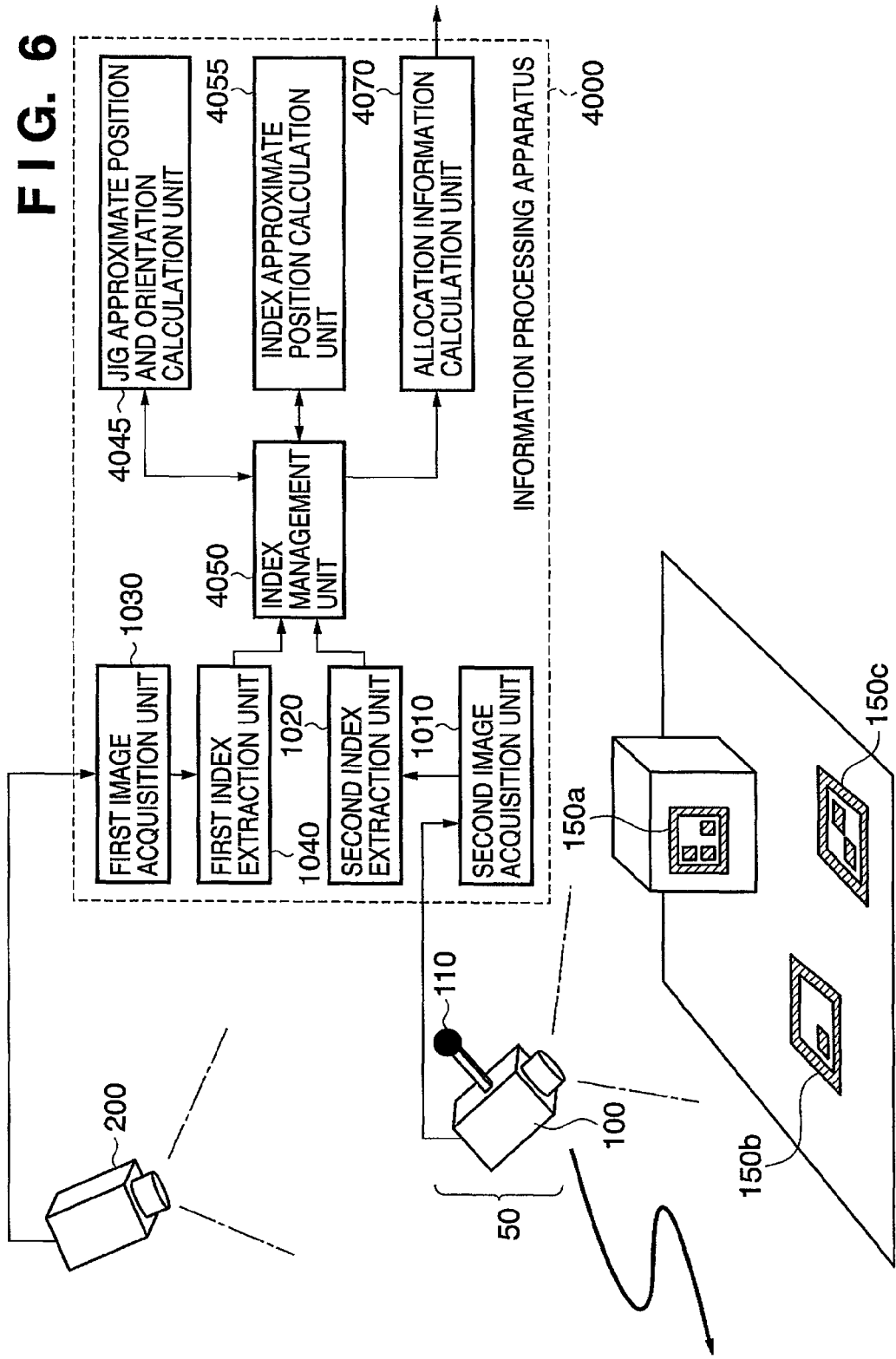
FIG. 6 is a block diagram showing the functional arrangement of a system according to the second embodiment of the present invention.

FIG. 6 is a block diagram showing the functional arrangement of a system according to this embodiment. The same reference numerals in FIG. 6 denote the same parts as in FIG. 1, and a repetitive description thereof will be avoided. As shown in FIG. 6, one or more image sensing devices 200 to be calibrated are connected to an information processing apparatus 4000. In this embodiment, the information processing apparatus 4000 calculates pieces of allocation information of the one or more image sensing devices 200 and environment allocation indices 300. In this embodiment as well, assume that the intrinsic parameters of each image sensing device 200 are known.

This embodiment is different from the first embodiment in that there are environment allocation indices 300 whose allocation information is known, and environment allocation indices 300 whose allocation information are unknown. Of each square index 150 shown in FIG. 3A, environment allocation indices whose allocation information is known will be referred to as "reference indices" hereinafter. One of images sensed by the image sensing device 100 need to include such reference index.

An index management unit 4050 manages various kinds of information to be described later.

When the environment allocation indices 300 extracted by the second index extraction unit 1020 include an index whose allocation information on the reference coordinate system is obtained, a jig approximate position and orientation calculation unit 4045 receives the image coordinates and allocation information of this index from the index management unit 4050. Then, the unit 4045 calculates the approximate position and orientation of the calibration jig 50 on the reference coordinate system. Note that the "index whose allocation information on the reference coordinate system is obtained" indicates a reference index or an index whose approximate allocation information on the reference coordinate system is obtained.

On the other hand, when the environment allocation indices 300 extracted by the second index extraction unit 1020 does not include any index whose allocation information on the reference coordinate system is obtained, the jig approximate position and orientation calculation unit 4045 executes the following processing. That is, the unit 4045 calculates the approximate position and orientation of the calibration jig 50 on a local coordinate system using pieces of approximate allocation information and image coordinates of the environment allocation indices 300. The calculated position and orientation are held in the index management unit 4050.

An index approximate position calculation unit 4055 estimates approximate allocation information of an environment allocation index 300 whose allocation information is unknown using the image coordinates of the environment allocation indices 300 and the approximate position and orientation of the calibration jig 50. When the approximate position and orientation of the calibration jig 50 are obtained on the reference coordinate system, the approximate allocation information on the reference coordinate system is obtained. On the other hand, when the approximate position and orientation of the calibration jig 50 are obtained on the local coordinate system, the approximate allocation information on the local coordinate system is obtained.

The index approximate position calculation unit 4055 further calculates the position of the index 110 using the allocation information of the index 110 held by the index management unit 4050 and the approximate position and orientation of the calibration jig 50 (on the reference or local coordinate system). The calculated approximate allocation information of the environment allocation index 300 and the position of the index 110 are held in the index management unit 4050 in association with the image coordinates.

When the sensed image includes neither a reference index nor an index whose approximate allocation information is obtained, the index approximate position calculation unit 4055 selects one of the extracted square indices, and defines a new local coordinate system using the environment allocation indices 300 specified by the vertices of the selected index. Furthermore, the unit 4055 sets allocation information of each environment allocation index 300 on this local coordinate system. When an environment allocation index 300 having allocation information on a certain coordinate system and an environment allocation index 300 having allocation information on another coordinate system are simultaneously observed, the unit 4055 integrates the two coordinate systems.

An allocation information calculation unit 4070 receives data of the image coordinates, approximate position, and allocation information of the index 110, the image coordinates and the approximate allocation information of the environment allocation indices 300, the approximate position and orientation of the calibration jig 50, and the like from the index management unit 4050. The unit 4070 calculates pieces of allocation information of the environment allocation indices 300 and the image sensing devices 200. The unit 4070 externally outputs the pieces of calculated allocation information of the image sensing devices 200 and environment allocation indices 300 as needed.

Figure 7:
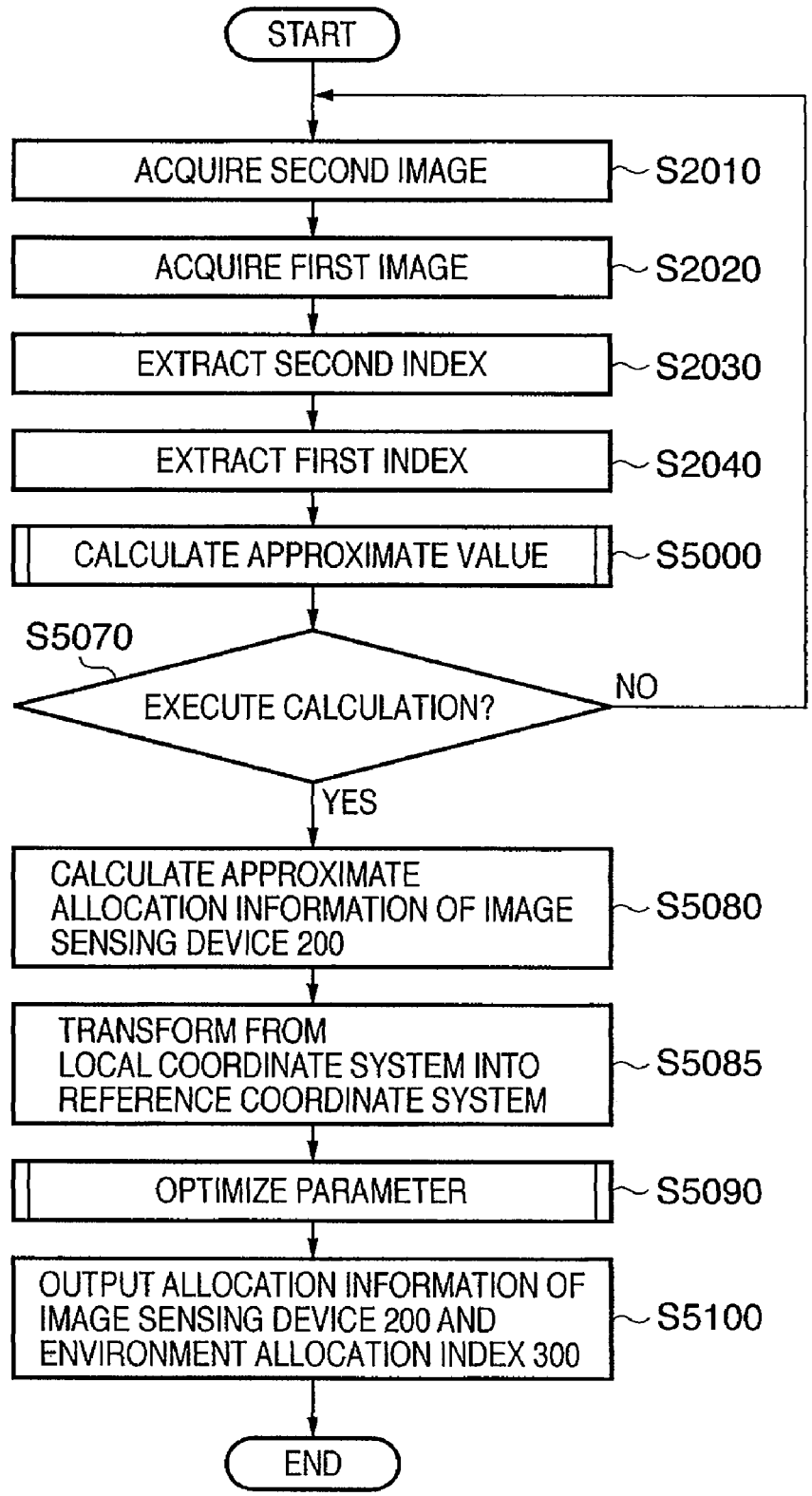
FIG. 7 is a flowchart of the processing executed by an information processing apparatus 4000 to calculate the position and orientation of each image sensing device 200 on the reference coordinate system, and the positions of environment allocation indices 300 on the reference coordinate system.

FIG. 7 is a flowchart of the processing executed by the information processing apparatus 400 to calculate the position and orientation of each image sensing device 200 on the reference coordinate system, and the positions of the environment allocation indices 300 on the reference coordinate system. Note that the same step numbers in FIG. 7 denote the same steps as in FIG. 2, and a description thereof will not be given. That is, since the processes in steps S2010 to S2040 are as have already been described in the first embodiment, a repetitive description thereof will be avoided.

In step S5000, the jig approximate position and orientation calculation unit 4045 and index approximate position calculation unit 4055 respectively calculate the approximate position and orientation of the calibration jig 50, pieces of approximate allocation information of the environment allocation indices 300, and the approximate position of the index 110.

Figure 8:
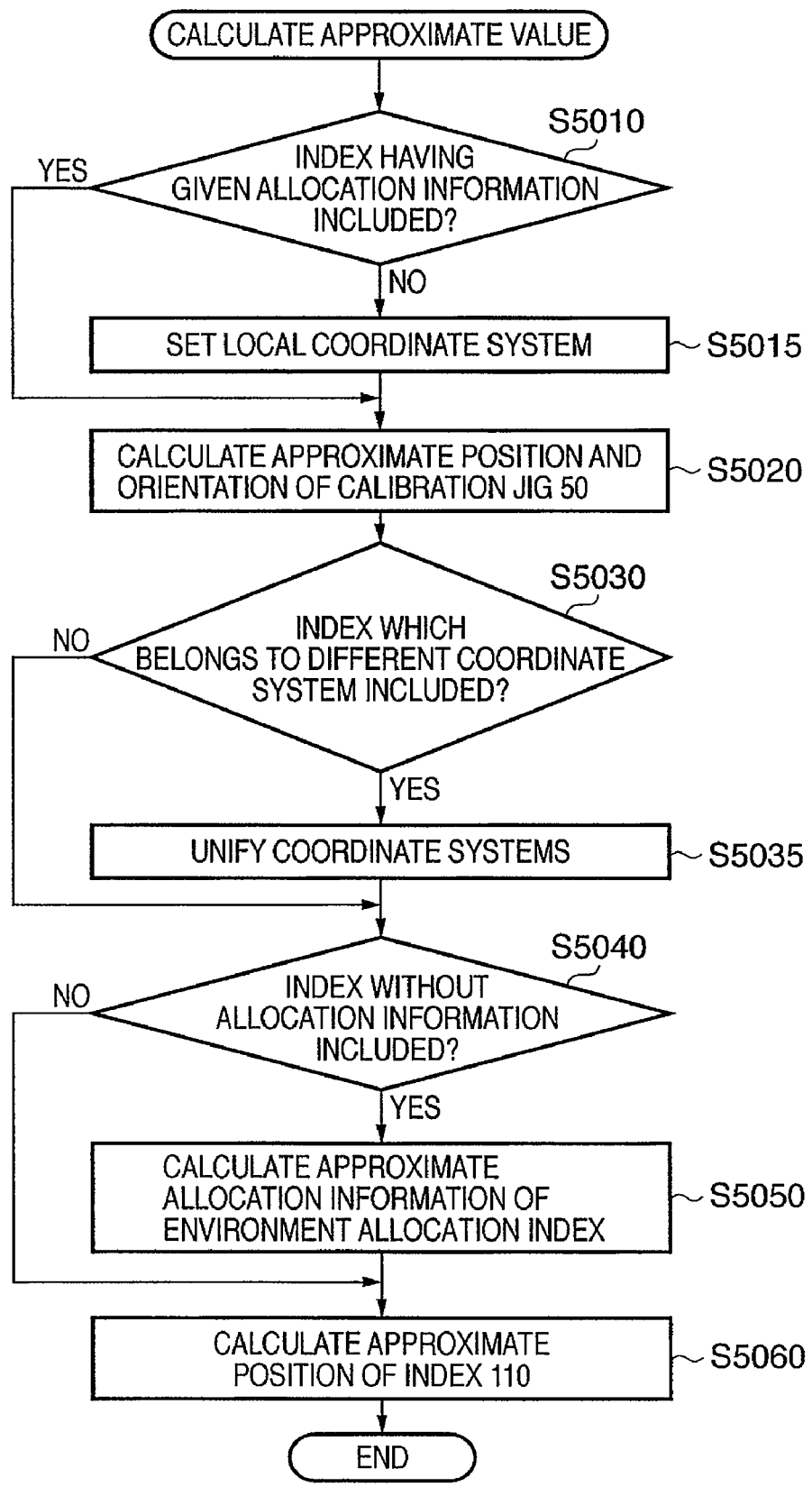
FIG. 8 is a flowchart showing details of the process in step S5000.

FIG. 8 is a flowchart showing details of the process in step S5000.

The index approximate position calculation unit 4055 checks in step S5010 if the environment allocation indices 300 extracted in step S2030 include a reference index or an index whose approximate allocation information has already been calculated. If the environment allocation indices 300 include these indices, the process jumps to step S5020; otherwise, the process advances to step S5015.

In step S5015, the index approximate position calculation unit 4055 selects one of the square indices 150a to 150c extracted in step S2030, and sets a new local coordinate system using the environment allocation indices 300 specified by the vertices of the selected index. For example, the unit 4055 defines a coordinate system represented by defining one vertex as an origin, and setting the coordinates of a vertex located at the right neighboring position (counterclockwise) of the origin to be (1, 0, 0), and those of a vertex located at the left neighboring position (clockwise) of the origin to be (0, 0, 1). When the size (the length of one side) of the selected one of the square indices 150a to 150c is unknown, the scale size of the defined local coordinate system is indefinite. When the size of each of the square indices 150a to 150c is known, the scale size of the local coordinate system can be set based on that size. For example, if it is known that the length of one side of the square indices 150a to 150c is 100 mm, the local coordinate system can be defined by setting the coordinates of the right-neighboring vertex to be (100, 0, 0) and those of the left-neighboring vertex to be (0, 0, 100).

In step S5020, the jig approximate position and orientation calculation unit 4045 calculates the approximate position and orientation of the calibration jig 50 at the time α as in step S2050 of the first embodiment. In this embodiment, the coordinate system to which the approximate position and orientation of the calibration jig 50 belong is determined depending on that to which the extracted environment allocation indices 300 belong. Note that "belonging to a given coordinate system" means that information on that coordinate system has been obtained. That is, when pieces of allocation information of the environment allocation indices 300 are obtained on the local coordinate system, the estimated values of the approximate position and orientation of the calibration jig 50 at the time α are those on the local coordinate system. When the environment allocation indices 300 which belong to different coordinate systems (the reference coordinate system and local coordinate system) are sensed at the same time, the approximate positions and orientations of the calibration jig 50 on the respective coordinate systems are calculated.

The index approximate position calculation unit 4055 checks in step S5030 if the environment allocation indices 300 extracted in step S2030 include indices which belong to different coordinate systems. If the environment allocation indices 300 include indices which belong to different coordinate systems, the process advances to step S5035; otherwise, the process jumps to step S5040.

In step S5035, the index approximate position calculation unit 4055 integrates a plurality of detected coordinate systems. If the detected coordinate systems include the reference coordinate system, the unit 4055 transforms the other coordinate system (local coordinate system) into the reference coordinate system. If the detected coordinate systems do not include the reference coordinate system, the unit 4055 selects one local coordinate system, and transforms the other local coordinate system into the selected local coordinate system. Based on the approximate positions and orientations of the calibration jig 50 on the respective coordinate systems calculated in step S5020, a transformation matrix from one coordinate system into the other coordinate system can be easily calculated. After the transformation matrix is obtained, the unit 4055 transforms all pieces of information (including pieces of information obtained at other times: pieces of approximate allocation information of the environment allocation indices 300, the approximate position and orientation of the calibration jig 50, and the approximate position information of the index 110) that belong to the coordinate system to be transformed to the selected coordinate system. The unit 4055 discards all pieces of information associated with the integrated coordinate system. When the scale size of one coordinate system is unknown, information for unifying the scale size is required. For example, when the calibration jig 50 is located at different positions, if the approximate positions and orientations of the calibration jig 50 on respective coordinate systems are obtained, the scale size can be unified based on the positional relationship of the calibration jig 50 on the respective coordinate systems.

The index approximate position calculation unit 4055 checks in step S5040 if the environment allocation indices 300 extracted in step S2030 include those whose allocation information is unknown. If the environment allocation indices 300 include those indices, the process advances to step S5050; otherwise, the process jumps to step S5060.

In step S5050, the index approximate position calculation unit 4055 estimates pieces of approximate allocation information of the environment allocation indices 300 whose allocation information is unknown. If the detected environment allocation indices 300 are defined by a square index whose size is known, the unit 4055 calculates the positions of indices on the camera coordinate system by the planar homography calculation. Furthermore, the unit 4055 estimates pieces of approximate allocation information of indices (on the reference coordinate system or local coordinate system) based on the approximate position and orientation of the calibration jig 50 calculated in step S5020. On the other hand, if the size of the square index is unknown, the unit 4055 estimates pieces of approximate allocation information of indices by a stereoscopic method using the acquired data at a plurality of times (the approximate positions and orientations of the calibration jig 50 and the detected coordinates of indices).

In step S5060, the index approximate position calculation unit 4055 estimates the approximate position of the index 110 extracted in step S2040 at the time α as in step S2060 of the first embodiment. In this embodiment, however, when the approximate position and orientation of the calibration jig 50 are obtained on the local coordinate system, the approximate position of the index 110 is that on the local coordinate system.

With the aforementioned processes in steps S2010 to S5060, sets of the image coordinates of the index 110 on the sensed images of the respective image sensing devices 200 at a given time α and the 3D coordinates on the reference coordinate system or local coordinate system can be obtained. Also, sets of the image coordinates of the environment allocation indices 300 on the physical space image sensed by the image sensing device 100 at a given time α and the 3D coordinates on the reference coordinate system or local coordinate system can be obtained.

The allocation information calculation unit 4070 checks in step S5070 if the data stored in the index management unit 4050 suffice to calculate pieces of allocation information of the image sensing devices 200 and those of the environment allocation indices 300. If it is determined that the currently acquired data suffice, the process advances to step S5080. On the other hand, if it is determined that the acquired data do not suffice, the process returns to step S2010 to execute the processes in steps S2010 to S5000 again. Since this checking process can be implemented based on the same criterion as in step S2070 of the first embodiment, a detailed description thereof will not be given.

By repeating the processes in steps S2010 to S5000 while moving the calibration jig 50 to different positions and orientations, data in states in which the index 110 is located at a plurality of coordinates can be obtained as in the first embodiment.

In step S5080, the allocation information calculation unit 4070 executes the same processing as in step S2080 of the first embodiment. That is, the allocation information calculation unit 4070 calculates pieces of approximate allocation information of the respective image sensing devices 200 using the sets of the image coordinates of the index 110 on the physical space images sensed by these image sensing devices 200, and its 3D coordinates (approximate position). In this embodiment, when a required number or more of indices 110 which belong to the reference coordinate system (having the approximate positions on the reference coordinate system) are detected, the unit 4070 calculates pieces of approximate allocation information of the image sensing devices 200 on the reference coordinate system. On the other hand, when a required number or more of indices 110 which belong to the local coordinate system are detected, the unit 4070 calculates pieces of approximate allocation information of the image sensing devices 200 on the local coordinate system. When one image sensing device 200 detects both the index 110 which belongs to a certain coordinate system and that which belongs to another coordinate system, the unit 4070 calculates the approximate positions and orientations of that image sensing device 200 on the respective coordinate systems. Note that integration (transformation from the local coordinate system to the reference coordinate system) of the coordinate systems in step S5085 is implemented using the pieces of approximate allocation information of the image sensing device 200 on the plurality of coordinate systems, which are obtained in this way.

In step S5085, the allocation information calculation unit 4070 transforms various kinds of information obtained on the local coordinate system into those on the reference coordinate system. If no local coordinate system is set in the processes executed so far, the process in this step is skipped. Using the pieces of approximate allocation information of the image sensing device 200 on the plurality of coordinate systems (the positions and orientations of the image sensing device 200 on the respective coordinate system) calculated in step S5080, the unit 4070 calculates a transformation matrix from one coordinate system to the other coordinate system. When the plurality of coordinate systems include the reference coordinate system, the unit 4070 calculates a transformation matrix for transforming the other coordinate system (local coordinate system) into the reference coordinate system. When the plurality of coordinate systems do not include the reference coordinate system, the unit 4070 selects one local coordinate system, and calculates a transformation matrix for transforming the other local coordinate system into the selected local coordinate system. After the transformation matrix is obtained, the unit 4070 transforms all pieces of information (the approximate allocation information of the image sensing device 200, pieces of approximate allocation information of the environment allocation indices 300, the approximate position and orientation of the calibration jig 50, and the approximate position information of the index 110) that belong to the coordinate system to be integrated to the selected coordinate system. When the scale size of one coordinate system is unknown, information for unifying the scale size is required. For example, when pieces of approximate allocation information of a plurality of image sensing devices 200 on respective coordinate systems are obtained in association with these image sensing devices 200, the scale size can be unified based on the positional relationship among the image sensing devices 200 on the respective coordinate systems.

In step S5090, the allocation information calculation unit 4070 calculates the pieces of allocation information of the environment allocation indices 300 and those of the image sensing devices 200 more precisely by taking consistency of the acquired data as a whole. With this processing, let $\psi_\alpha$ be the position and orientation of the calibration jig 50 at each time $\alpha$, $s_j$ be pieces of allocation information of respective image sensing devices 200, and $a_{wi}$ be pieces of approximate allocation information of the environment allocation indices 300 other than the reference indices as variables (unknown parameters). Note that i (i=1, 2, ..., N$_3$) is an identifier of each environment allocation index 300 other than the reference index, and N$_3$ represents the number of such indices. Since respective approximate values have been calculated until step S5085, they are used as initial values. Then, the unit 4070 optimizes these parameters so as to minimize the sum of residual errors of projection errors on the respective indices (the index 110 and environment allocation indices 300). Details of the process in step S5090 will be described later.

In step S5100, the allocation information calculation unit 4070 outputs pieces of allocation information of the environment allocation indices 300 on the reference coordinate system and those of the image sensing devices 200 on the reference coordinate system.

Figure 9:
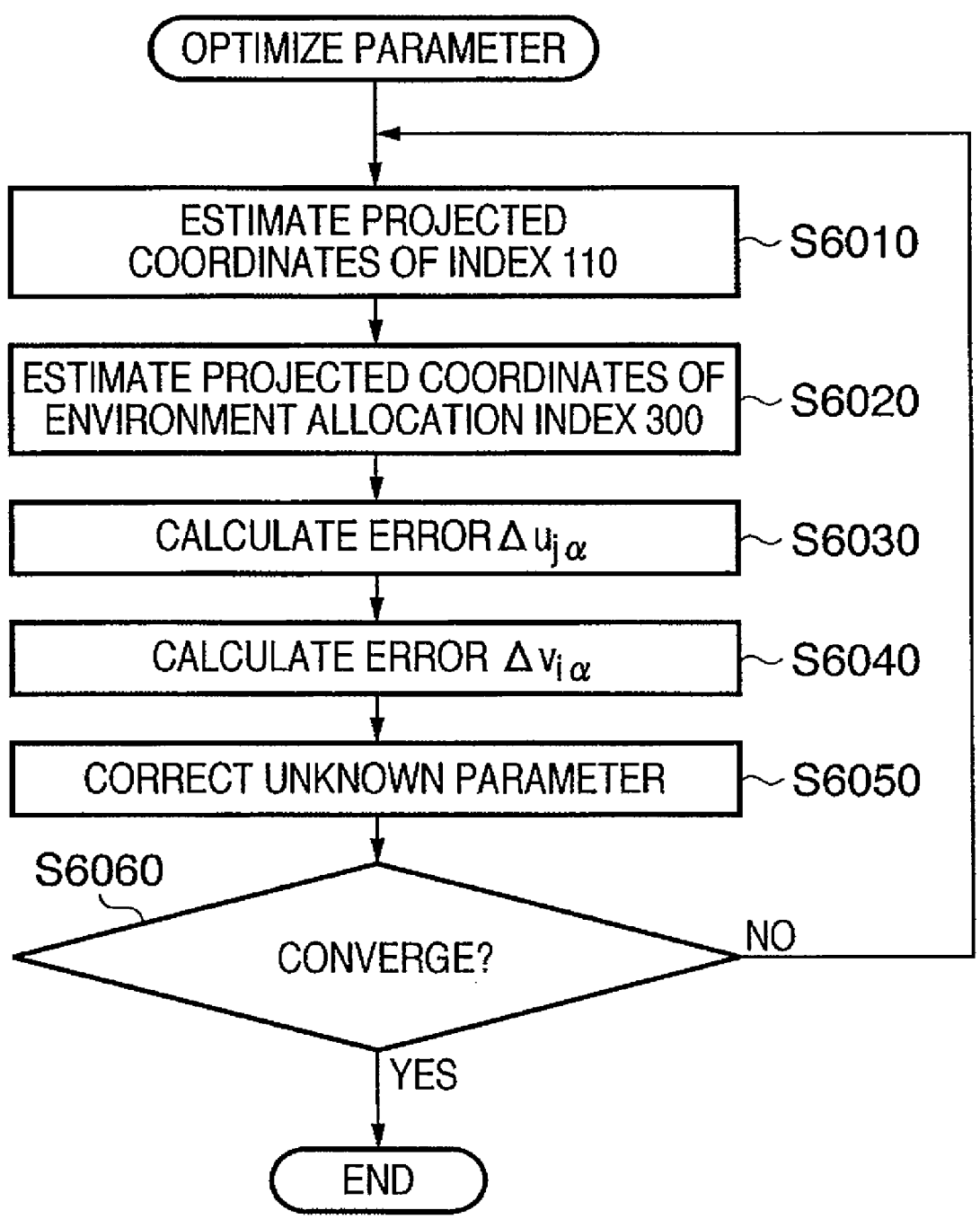
FIG. 9 is a flowchart showing details of the process in step S5090.

FIG. 9 is a flowchart showing details of the process in step S5090.

In the following description, unknown parameters to be optimized by the process in step S5090 are expressed by (N$_1$+N$_2$)×6+N$_3$×3 dimensional state vector t=[s$^T$, $\psi^T$, a$^T$]$^T$. Note that s and $\psi$ are the same as those in the first embodiment, and a=[a$_{w1}^T$, ..., a$_{wN3}^T$]$^T$. Also, t0, s$_{j0}$, and $\psi_{\alpha 0}$ represent the estimated values of the respective parameters at the current timing as in the first embodiment. Likewise, let a$_{wi0}$ be the estimated value, at the current timing, of the allocation information of the environment allocation index 300 with an identifier i.

In step S6010, the allocation information calculation unit 4070 estimates, based on the equation (6), the projected coordinates of all the detected indices 110 as in step S3010 of the first embodiment.

In step S6020, the allocation information calculation unit 4070 estimates the projected coordinates of all the detected environment allocation indices 300 based on equation (7) as in step S3020 of the first embodiment. In this embodiment, the index approximate position calculation unit 4055 calculates the approximate values of pieces of allocation information of the environment allocation indices 300 other than the reference indices (with given allocation information) and holds them in the index management unit 4050.

In step S6030, the allocation information calculation unit 4070 calculates projection errors $\Delta u_{j\alpha}$ of the indices 110 using equation (8) as in step S3030 of the first embodiment.

In step S6040, the allocation information calculation unit 4070 calculates projection errors $\Delta v_{i\alpha}$ of the environment allocation indices 300 using equation (9) as in step S3040 of the first embodiment.

In step S6050, the allocation information calculation unit 4070 corrects the state vector t so as to minimize the projection errors calculated in steps S6030 and S6040.

Derivation of a simultaneous equation (equation (31) to be described later) required to calculate a correction value will be described first.

The projection error $\Delta u_{j\alpha}$ of the index 110 can be expressed by equation (10) above as a function of $s_j$ and $\psi_\alpha$ as in the first embodiment. On the other hand, in this embodiment, the projection error $\Delta v_{i\alpha}$ of each environment allocation index 300 can be rewritten as a function of $\psi_\alpha$ and $a_{wi}$:

$$\Delta v_{i\alpha} = E_2(\psi_\alpha, a_{wi}) \tag{25}$$

Of the environment allocation indices 300, a projection error $\Delta v_{i'\alpha}$ of each reference index is expressed as a function of $\psi_\alpha$ as in equation (11) of the first embodiment by:

$$\Delta v_{i'\alpha} = E_{2i'}(\psi_\alpha) \tag{26}$$

In the following description, let $\xi'$ be a serial number assigned to "observation of each individual reference index by the image sensing devices 100 at all times". Let N$_{5'}$ be the total number (gross number) of reference indices detected on all the images sensed by the image sensing device 100 (that is, $\xi'=1, \ldots, N_{5'}$). In the following description, the projection error of a $\xi'$-th point is expressed by $\Delta^{\xi'} = -\Delta v_{i'\alpha}$.

The projection errors $\Delta u_{j\alpha}$, $\Delta v_{i\alpha}$, and $\Delta v_{i'\alpha}$ are theoretically zero but are not zero in practice since they include errors. Hence, as in the first embodiment, the state vector t is estimated based on a nonlinear least square method to minimize the sum of projection errors of all observation data, that is, so as to minimize J, H, and H' given by:

$$J = \frac{1}{2} \sum_{j=1}^{N_2} \sum_{\alpha \in A_j} E_{1j}(s_j, \psi_\alpha)^2 \tag{27}$$

$$H = \frac{1}{2} \sum_{\alpha=1}^{N_1} \sum_{i \in I_\alpha} E_2(\psi_\alpha, a_{wi})^2 \tag{28}$$

$$H' = \frac{1}{2} \sum_{\alpha=1}^{N_1} \sum_{i \in I'_\alpha} E_{2i'}(\psi_\alpha)^2 \tag{29}$$

where I$_\alpha$ represents a set of environment allocation indices 300, other than the reference indices, observed (extracted) by the image sensing device 100 at the time $\alpha$. Also, I'$_\alpha$ represents a set of the reference indices observed (extracted) by the image sensing device 100 at the time $\alpha$.

The method of calculating the state vector t to minimize J, H, and H' may be a Gauss-Newton method, a Levenberg-Marquardt method, or other known optimization methods. For example, the solving method using the Gauss-Newton method will be described below.

As in the first embodiment, the partial derivatives of J with respect to components of $s_j$ and $\psi_\alpha$ are equated to zero. Also, the partial derivatives of H with respect to components of $\psi_\alpha$ and $a_{wi}$ are equated to zero. Furthermore, the partial derivatives of H' with respect to components of $\psi_\alpha$ are equated to zero. As in the first embodiment, partial differential coefficients obtained by partially differentiating $E_{1j}(s_{j0}, \psi_{\alpha 0})$ with respect to respective components of the state vector t are generally expressed by a vector J$_n$ (n=1, 2, ..., N$_4$). Also, partial differential coefficients obtained by partially differentiating $E_{2i}(\psi_{\alpha 0}, a_{wi0})$ with respect to respective components of the state vector t are generally expressed by a vector K$_\xi$ ($\xi=1, 2, \ldots, N_5$). Furthermore, partial differential coefficients obtained by partially differentiating $E_{2t'}(\psi_{\alpha 0})$ with respect to respective components of the state vector t are generally expressed by a vector $K'_{\xi'}$ ($\xi'=1, 2, \ldots, N_{5'}$). Since the partial differential coefficients can be easily derived from the observation equations, a detailed description of their calculation method will not be given. Such as the first embodiment, combining these results yields simultaneous equation (30) associated with a correction vector $\Delta$:

$$\begin{bmatrix} J_1 \\ \vdots \\ J_{N_4} \\ K_1 \\ \vdots \\ K_{N_5} \\ K'_1 \\ \vdots \\ K'_{N_{5'}} \end{bmatrix}^T \begin{bmatrix} J_1 \\ \vdots \\ J_{N_4} \\ K_1 \\ \vdots \\ K_{N_5} \\ K'_1 \\ \vdots \\ K'_{N_{5'}} \end{bmatrix} \Delta = \begin{bmatrix} J_1 \\ \vdots \\ J_{N_4} \\ K_1 \\ \vdots \\ K_{N_5} \\ K'_1 \\ \vdots \\ K'_{N_{5'}} \end{bmatrix} \begin{bmatrix} \Delta u_1 \\ \vdots \\ \Delta u_{N_4} \\ \Delta v_1 \\ \vdots \\ \Delta v_{N_5} \\ \Delta v'_1 \\ \vdots \\ \Delta v'_{N_{5'}} \end{bmatrix} \quad (30)$$

where $\Delta=[\Delta s_1 \ldots \Delta s_{N2}, \Delta \psi_1 \ldots \Delta \psi_{N1}, \Delta a_{w1} \ldots \Delta a_{wN5}]^T$, and represents the correction values of the respective parameters of the state vector t. By combining equation (30) using a Jacobian matrix $J=[\Delta J_1 \ldots \Delta J_{N4}, \Delta K_1 \ldots \Delta K_{N5}, \Delta K'_1 \ldots \Delta K'_{N5'}]^T$ and an error vector $E=[\Delta u_1 \ldots \Delta u_{N4}, \Delta v_1 \ldots \Delta v_{N5}, \Delta v'_1 \ldots \Delta v'_{N5'}]^T$, we have:

$$J^T J \Delta = J^T E \quad (31)$$

In step S6050, the allocation information calculation unit 4070 calculates the correction value $\Delta$ by solving the aforementioned simultaneous equation. The solving method of the simultaneous equation may use any known solving methods, as described in the first embodiment. In step S6050, the unit 4070 further corrects, using the calculated correction value $\Delta$, the current state vector $t_0$ according to the equation (21), and sets the obtained vector as a new state vector t.

The allocation information calculation unit 4070 checks in step S6060 if calculations converge using some criteria as to whether or not the error vector E is smaller than a predetermined threshold or whether or not the correction value $\Delta$ is smaller than a predetermined threshold. If calculations converge, the process in step S5090 ends, and advances to step S5100. On the other hand, if calculations do not converge, the process returns to step S6010 to repeat the processes in steps S6010 to S6050. At this time, the unit 4070 uses the corrected state vector t corrected in step S6050 as the next $t_0$.

As described above, according to this embodiment, the pieces of allocation information of the image sensing devices 200 and environment allocation indices 300 can be calculated together. Since the image sensing device 100 need only sense the environment allocation indices 300 allocated on the physical space, indices which define the reference coordinate system need not to be allocated within the image sensing range of each image sensing device 200. Also, the process for calculating the relative relationship between a reference object and cameras, that for transforming into the reference coordinate system, and that for measuring pieces of allocation information of indices allocated on the physical space, which are independently executed in the conventional system, can be integrated, so the processing can be simplified. In addition, limitations on the allocation method of indices to be allocated on the physical space can be eliminated.

With the conventional method which calibrates the environment allocation indices 300 using only the image sensing device 100, all indices need to be sensed to be linked together. However, according to this embodiment, indices which cannot be sensed to be linked together can be calibrated. Furthermore, since the observation information of the index 110 by each image sensing device 200 is used as the constraint condition of the optimization calculation (step S5090), the precision of the environment allocation indices 300 to be estimated can be improved.

<Modification 2-1>

In the second embodiment, only pieces of information of the environment allocation indices 300, the approximate allocation information of which has been obtained at that time, are used in the calculations of the approximate position and orientation of the calibration jig 50 (step S5050). Also, only local data are used in calculations of pieces of approximate allocation information of the environment allocation indices 300 (step S5060). For this reason, sufficiently high precision cannot often be obtained. To solve this problem, prior to the process in step S5090, bundle adjustment using all data sensed by the image sensing device 100 may be executed as step S5085 to improve the precision of both the allocation information of the environment allocation indices 300 and the position and orientation of the calibration jig 50. In this case, the process in step S5070 is executed between steps S5085 and S5090.

Improving the initial values in this way eliminates the probability of a local solution in the process in step S5100, and can improve the convergence speed of the repetitive calculations.

<Modification 2-2>

Figure 4B:
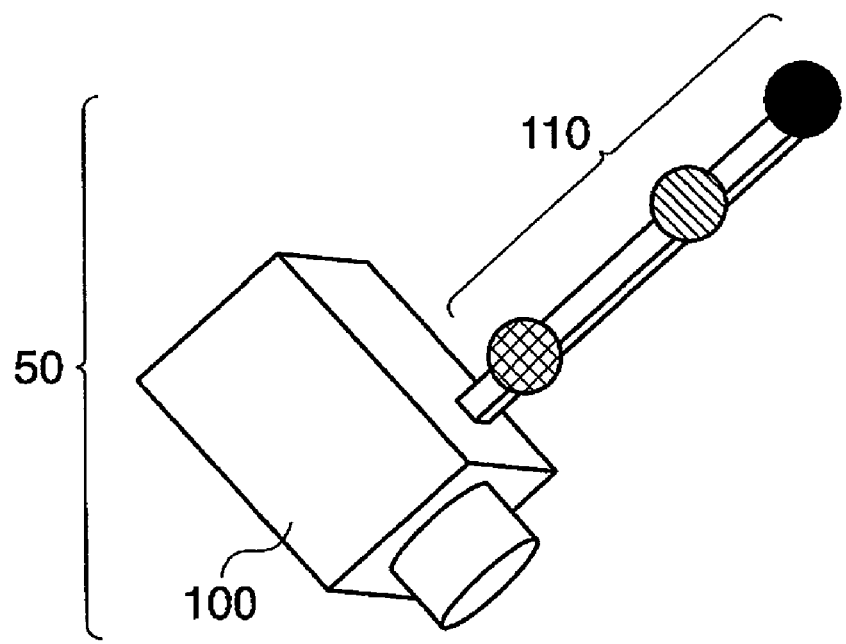
FIG. 4B shows an outer appearance example of the calibration jig 50 having three indices 110.

In the first and second embodiments, the calibration jig 50 has one image sensing device 100, as shown in FIGS. 4A and 4B. However, the calibration jig 50 can have a plurality of image sensing devices 100. With this arrangement, the environment allocation indices 300 can be sensed more efficiently.

Figure 10A:
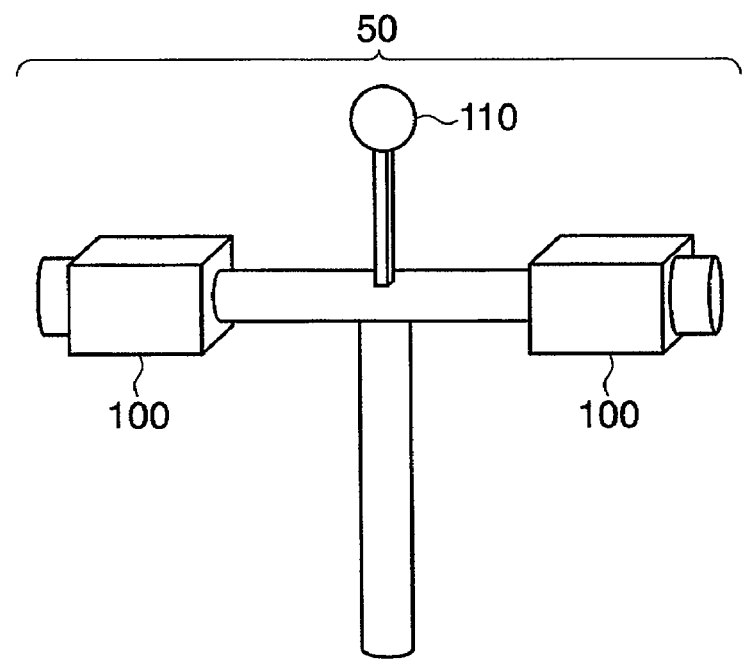
FIG. 10A shows a configuration example of the calibration jig 50.
Figure 10B:
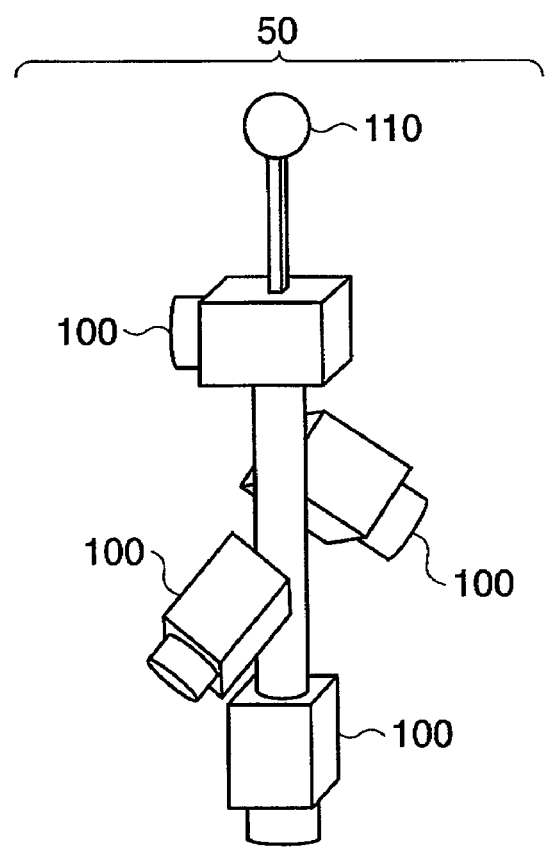
FIG. 10B shows a configuration example of the calibration jig 50.
Figure 10C:
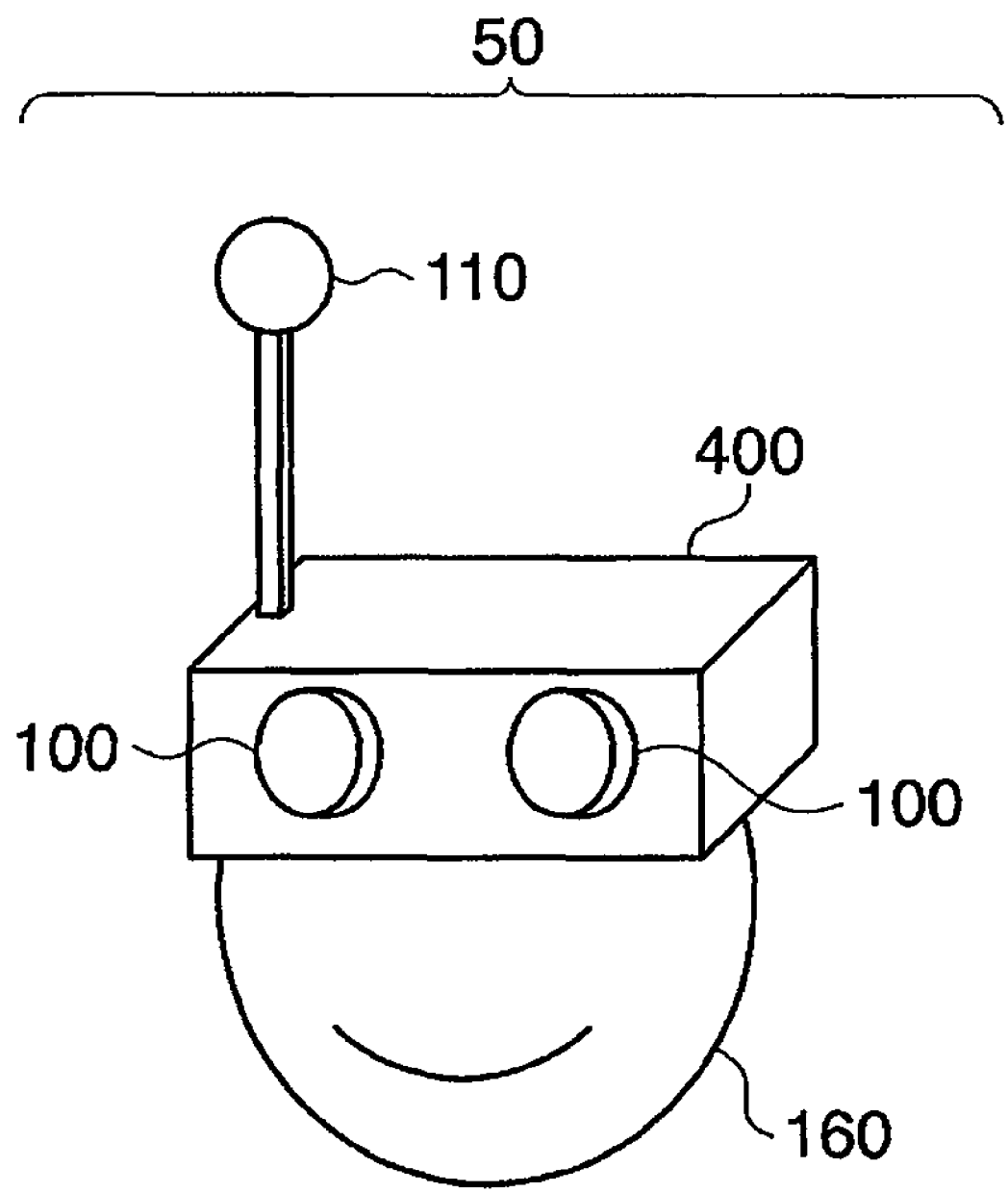
FIG. 10C shows a configuration example of the calibration jig 50.

For example, the calibration jig 50 may be configured using two image sensing devices 100, as shown in FIG. 10A. Also, the calibration jig 50 may be configured using more image sensing devices 100, as shown in FIG. 10B. Furthermore, a video-see-through HMD (Head Mount Display) 400 having the index 110 may be used as the calibration jig 50, as shown in FIG. 10C. In this case, built-in cameras of the video-see-through HMD 400 can be used as image sensing devices 100. At this time, when the user who wears the video-see-through HMD 400 moves within the image sensing range of each image sensing device 200, that image sensing device 200 can be calibrated. FIGS. 10A to 10C show configuration examples of the calibration jig 50.

When the calibration jig 50 is configured by the plurality of image sensing devices 100, the allocation information of each individual image sensing device 100 on a coordinate system defined by the calibration jig 50 need to be calculated in advance. Also, the camera intrinsic parameters of each image sensing device 100 need to be given.

Using the plurality of image sensing devices 100, the position and orientation of the calibration jig 50 can be calculated in step S2050 or S5050 as long as at least one image sensing device 100 senses the environment allocation indices 300. In step S2090 or S5100, the same processing as in the above embodiments can be executed except that data obtained from the plurality of image sensing devices 100 are distinctly processed. Since the number of environment allocation indices 300 to be observed is increased, the optimization calculations can be implemented with higher precision.

In the first and second embodiments, the calibration jig 50 has one index 110, as shown in FIG. 4A. However, the calibration jig 50 may have a plurality of indices 110. In this case, since each image sensing device 200 observes a plurality of points at the same time, data can be efficiently acquired. For example, FIG. 4B shows an example of the calibration jig 50 having three indices 110. When the plurality of indices 110 are used, the position $x_c$ on the calibration jig coordinate system need to be given to each individual index 110. The same processing as in the above embodiments can be executed except that data obtained in association with the plurality of indices 110 are distinctly processed.

When pieces of allocation information of the plurality of indices 110 with respect to the calibration jig 50 are known as in FIG. 4B, the scale size of a local coordinate system can be calculated using these pieces of information. As in the case in which the calibration jig 50 is configured by the plurality of image sensing devices 100, the scale size of a local coordinate system can be calculated using the relative relationship among the image sensing devices.

A plurality of calibration jigs 50 may be simultaneously used. In this case, the processes up to step S2060 or step S5070 are independently executed for each individual calibration jig 50. Then, the subsequent processes including optimization may be performed by using all the data.

As described above, using the plurality of image sensing devices 100 or the indices 110 in the calibration jig 50, or using the plurality of calibration jigs 50, a larger number of indices can be sensed within a shorter period of time. Furthermore the scale size can be easily calculated. For this reason, the environment allocation indices 300 and image sensing devices 200 can be efficiently calibrated.

<Modification 2-3>

The first and second embodiments are achieved under the condition that the image sensing device 100 always senses the environment allocation indices 300. In other words, when the image sensing device 100 does not sense the environment allocation indices 300 at a given time (timing), images sensed by the image sensing devices 200 at that time are not used. However, the observation data of the index 110 simultaneously sensed by the plurality of image sensing devices 200 can be used in the optimization calculations of the parameters even when the image sensing device 100 does not sense the environment allocation indices 300.

A method of use of observation data of the index 110 by the plurality of image sensing devices 200 at a time α' at which the image sensing device 100 does not sense the environment allocation indices 300 will be briefly described below. The following description will be given taking the first embodiment as an example. However, in case of the second embodiment, the processes can be similarly expanded.

After the process in step S2040, it is checked if the image sensing device 100 senses the environment allocation indices 300 (whether or not to proceed with the process in step S2050). If NO is determined, the processes in steps S2050 and S2060 are skipped. At this time, if the plurality of image sensing devices 200 simultaneously sense the index 110, a set of the image coordinates are held.

After the process in step S2080 (step S2085), the approximate positions of the index 110 on the reference coordinate system at respective times α', the image coordinates of which are held in the above step, are calculated. Since the pieces of approximate allocation information of the respective image sensing devices 200 are obtained in step S2080, the approximate positions of the index 110 can be calculated using the principle of triangulation.

Finally, the optimization calculations in step S2090 are modified to a form that uses the aforementioned data. That is, the positions of the index 110 at respective times α' are added to the state vector t, and the optimization calculations of the parameters that can achieve the consistency as a whole are made. In step S3010, the projected coordinates of the index 110 are calculated using the approximate positions of the index 110 on the reference coordinate system and the pieces of approximate allocation information of the image sensing devices 200. In step S3030, projection errors between the calculated projected coordinates and extracted coordinates are then calculated. At this time, the projection error is calculated as a function of the allocation information $s_j$ of each image sensing device 200 and the position of the index 110. In step S3050, the observation data of the index 110 at respective times α' are added to the simultaneous equation given by equation (19). That is, a matrix that combines the projection errors of the index 110 and the partial differential coefficients is added to E and J. Then, by solving this simultaneous equation, a correction value that reduces errors of the respective parameters is calculated.

<Modification 2-4>

In the second embodiment, the allocation information of the index 110 with respect to the calibration jig 50 is known. However, the allocation information $x_c$ of the index 110 with respect to the calibration jig 50 may be calculated as an unknown parameter. The calculation method is the same as that in modification 1-6 of the first embodiment, and a repetitive description thereof will be avoided.

<Modification 2-5>

The second embodiment is premised on that the reference indices for defining the reference coordinate system exist. However, the method of defining the reference coordinate system is not limited to this, and the reference coordinate system may be defined by other methods. For example, when the square indices 150a to 150c whose size is known are used, if the allocation information of one image sensing device 200 on the reference coordinate system is known, the reference coordinate system can be defined by that information. When pieces of allocation information of the two or more image sensing devices 200 on the reference coordinate system are known, the reference coordinate system can be defined by these pieces of information.

A local coordinate system is arbitrarily defined using the extracted environment allocation indices 300, and pieces of allocation information of the environment allocation indices 300 are set. The aforementioned jig approximate position and orientation calculation unit 4045 calculates the approximate position and orientation of the calibration jig 50 on the local coordinate system based on the pieces of the environment allocation indices 300 on the local coordinate system and their image coordinates. The index approximate position calculation unit 4055 calculates pieces of approximate allocation information of the environment allocation indices 300 whose allocation information is unknown on the local coordinate system using the image coordinates of the environment allocation indices 300 and the approximate position and orientation of the calibration jig 50 on the local coordinate system. Furthermore, the unit 4055 calculates the position of the index 110 on the local coordinate system using the allocation information of the index 110 with respect to the calibration jig 50, and the approximate position and orientation of the calibration jig 50 on the local coordinate system. Since the calculation method is as has been described above, a repetitive description thereof will be avoided. A transformation matrix from the local coordinate system to the reference coordinate system is calculated based on the correspondence between the plurality of positions of the index 110 on the reference coordinate system and the positions of the index 110 on the local coordinate system, thus transforming the coordinate system. In this way, pieces of approximate allocation information of the environment allocation indices 300 on the reference coordinate system can be estimated.

As described above, when pieces of allocation information of the two or more fixed image sensing devices 200 are known, pieces of approximate allocation information of the environment allocation indices 300 on the reference coordinate system can be estimated. Therefore, the reference indices need not exist.

When only the relative orientation of the plurality of image sensing devices 200 is the goal, since defining the "reference coordinate system" itself is not necessary, no reference indices are required as a matter of course. When the square indices 150a to 150c whose size is known are available, the relative allocation relationship of the image sensing devices 200 can be calculated as well as the scale size. On the other hand, when the size of the square indices 150a to 150c is unknown, the scale size of the space becomes indefinite. When only the calibration of the image sensing devices 200 is the goal, the precision of the calibration can be improved using the environment allocation indices 300 whose allocation information is unknown, and the image sensing devices 200 which cannot sense indices to link them together can be calibrated.

<Modification 2-6>

In this embodiment, in order to unify independent coordinate systems into one coordinate system, the scale size need to be matched. If at least one of the pieces of allocation information of the environment allocation indices 300 or the plurality of image sensing devices 200 or pieces of allocation information of the plurality of image sensing devices 100 or those of the plurality of indices 110 which configure the calibration jig 50 can specify a scale size in advance, the coordinate systems can be unified using the aforementioned method. That is, the pieces of allocation information of the environment allocation indices 300 and those of the image sensing devices 200 fixed on the physical space can be calculated.

<Modification 2-7>

In the second embodiment, the environment allocation indices 300 are limited to the vertices of the square indices 150a to 150c. However, the type of the environment allocation indices 300 is not limited to this, and any other forms may be adopted as long as they can be detected on the physical space image and are identifiable from each other such as the first embodiment.

When the relative relationship of the environment allocation indices 300 is unknown, the approximate position and orientation calculation process of the calibration jig 50 in step S5020 and the approximate allocation information calculation process of the environment allocation indices 300 in step S5050 cannot be executed. In this case, using data of a plurality of indices sensed at a plurality of viewpoints, these pieces of information are calculated. The calculations can use a known factorization method (see non-patent reference 11). That is, with this method, n points (n≧3) of indices are sensed while moving the image sensing device 100. Then, using the image coordinates of indices extracted from m (m≧3) images, the positions and orientations of the image sensing device 100 at respective viewpoints and pieces of allocation information of the n points of indices are calculated. Also, a known method that calculates the position and orientation of each image sensing device by epipolar geometry based on corresponding points between images, and calculates pieces of allocation information of indices by a stereoscopic method (see non-patent reference 10) may be used.

<Modification 2-8>

In the second embodiment, the reference indices are the environment allocation indices which define the square indices 150a to 150c shown in FIG. 3A and the allocation information and size of which are known. However, the type of the each reference index is not limited to this. For example, point indices 160a to 160c like circular indices respectively having different colors, as shown in FIG. 3C, may be used. In this case, three or more points of the point indices 160a to 160c whose allocation information on the reference coordinate system is known, and which are not located on an identical line are used as reference indices.

<Modification 2-9>

The goal of the second embodiment is to calculate pieces of allocation information of the image sensing devices 200 and the environment allocation indices 300. However, when the pieces of allocation information of the image sensing devices 200 are known, only the calibration of the environment allocation indices 300 may be implemented. In this case, the allocation information s of each image sensing device 200 may be handled as a fixed value. When only the calibration of the environment allocation indices 300 is the goal, if image sensing devices 200 each whose allocation information is unknown are used, the precision of the calibration can be improved, and indices which cannot be sensed to be linked together can be calibrated.

Even when no reference indices exist, the second embodiment can be used for the purpose of estimating the relative allocation relationship among the environment allocation indices 300. Of course, the second embodiment can be used for the purpose of not only the calibration of indices but also improvement of 3D reconstruction (a technique called Shape From Motion) of points using an image sequence.

Third Embodiment

The respective units that form the information processing apparatus 1000 shown in FIG. 1 and those which form the information processing apparatus 4000 as shown in FIG. 6 may be implemented in the form of a computer program. In this case, the computer program is stored in a memory of a computer such as a PC (personal computer) or the like, and a CPU or the like of this computer executes that computer program.

Figure 11:
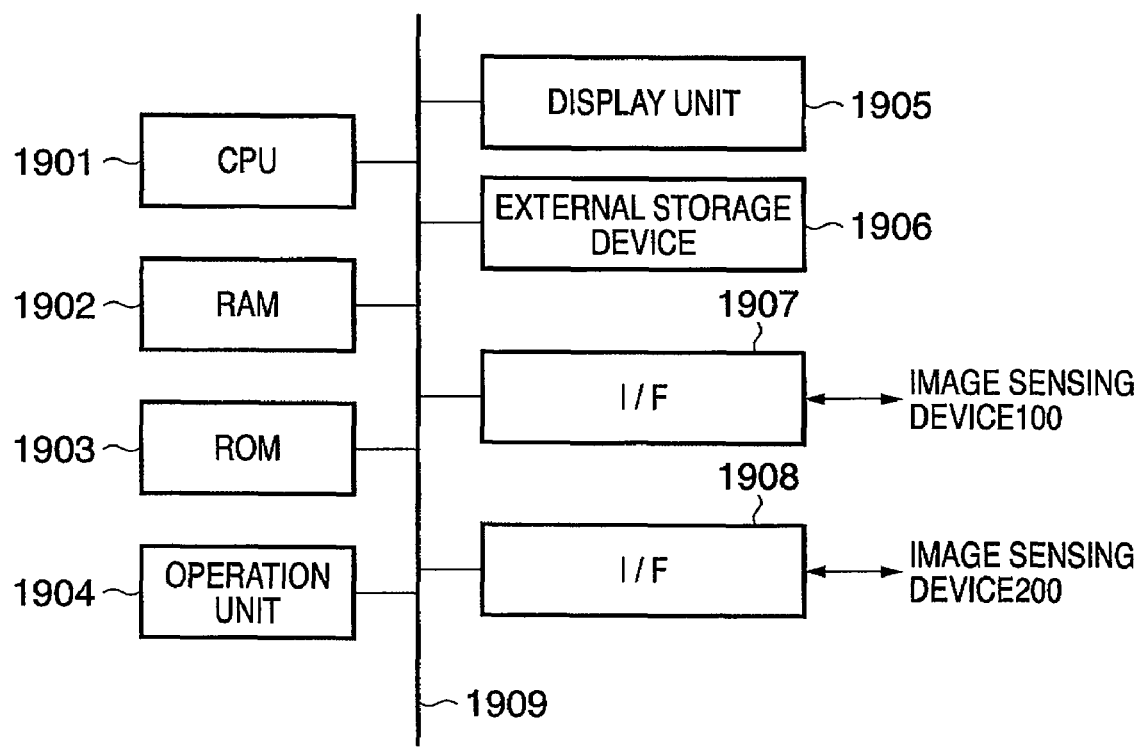
FIG. 11 is a block diagram showing an example of the hardware arrangement of a computer which can be applied to the information processing apparatuses 1000 and 4000.

FIG. 11 is a block diagram showing an example of the hardware arrangement of a computer which can be applied to the information processing apparatuses 1000 and 4000.

A CPU 1901 controls the overall computer using programs and data stored in a RAM 1902 and ROM 1903, and executes the aforementioned processes to be implemented by the information processing apparatus 1000 or 4000 to which this computer is applied.

The RAM 1902 has an area for temporarily storing programs and data loaded from an external storage device 1906 and physical space image data received via I/Fs (interfaces) 1907 and 1908. Also, the RAM 1902 has a work area used when the CPU 1901 executes respective processes. That is, the RAM 1902 can provide various areas as needed.

The ROM 1903 stores setting data, a boot program, and the like of this computer.

An operation unit 1904 comprises a keyboard, mouse, and the like. When the user of this computer operates the operation unit 1904, the user can input various instructions. The user instructions described in the aforementioned embodiments are input using this operation unit 1904.

A display unit 1905 comprises a CRT, liquid crystal display, or the like, and can display the processing results of the CPU 1901 by means of images, characters, and the like.

The external storage device 1906 is a large-capacity information storage device represented by a hard disk drive. The external storage device 1906 saves an OS (operating system), and programs and data for making the CPU 1901 execute the respective processes which have been described as those to be implemented by the information processing apparatus 1000 or 4000. The external storage device 1906 also saves, as data, various kinds of known information described in the above embodiments. The programs and data saved in the external storage device 1906 are loaded onto the RAM 1902 under the control of the CPU 1901 as needed, and are to be processed by the CPU 1901.

The I/Fs 1907 and 1908 respectively serve as interfaces for connecting the image sensing devices 100 and 200 to this computer. Data of physical space images of respective frames sensed by the image sensing device 100 are output to the external storage device 1906 or RAM 1902 via the I/F 1907. Data of physical space images of respective frames sensed by each image sensing device 200 are output to the external storage device 1906 or RAM 1902 via the I/F 1908.

Reference numeral 1909 denotes a bus which interconnects the aforementioned units.

Other Embodiments

The objects of the present invention can be achieved as follows. That is, a recording medium (or storage medium), which records a program code of software that can implement the functions of the above-mentioned embodiments is supplied to a system or apparatus. Of course, the recording medium is a computer-readable medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted into or connected to the computer, respectively. After that, the functions of the above-mentioned embodiments are implemented by some or all of actual processing executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-067593 filed Mar. 15, 2007, which is hereby incorporated by reference herein in its entirety.

What is claimed is:

1. An information processing apparatus comprising:
a first acquisition unit adapted to acquire, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
a first extraction unit adapted to extract image coordinates of the first index from each of the first images to acquire the image coordinates of the first index at the plurality of times;
a second acquisition unit adapted to acquire a plurality of second images sensed by the second image sensing device at the plurality of times;
a second extraction unit adapted to extract image coordinates of the second index from each of the second images to acquire the image coordinates of the second index at the plurality of times; and
a calculation unit adapted to calculate a camera parameter of the first image sensing device by using simultaneously the image coordinates of the first index and the second index at the plurality of times, which are respectively extracted by said first extraction unit and said second extraction unit.

2. The apparatus according to claim 1, wherein said first acquisition unit and said second acquisition unit synchronously acquire images.

3. The apparatus according to claim 1, wherein the camera parameter includes a position and orientation as extrinsic parameters and at least one of a focal length, coordinates of an image center, scale factors in x- and y-axis directions, and shearing coefficient as intrinsic parameters.

4. The apparatus according to claim 1, wherein said calculation unit adapted to further calculate a position of the first index on the second image sensing device.

5. The apparatus according to claim 1, wherein said calculation unit adapted to further calculate intrinsic parameters of the second image sensing device.

6. The apparatus according to claim 1, wherein said calculation unit adapted to further calculate a position of at least one second index.

7. The apparatus according to claim 1, wherein a plurality of the first image sensing devices and/or the second image sensing devices are connected.

8. The apparatus according to claim 1, wherein said calculation unit comprises:
a first unit adapted to estimate a position and orientation of the second image sensing device using the image coordinates of the second index extracted by said second extraction unit and a position of the second index on the physical space, which is given in advance as known information;
a second unit adapted to calculate a position of the first index on the physical space using a position of the first index on the second image sensing device, which is given in advance as known information, and the position and orientation of the second image sensing device, which are estimated by said first unit; and
a third unit adapted to calculate the parameter to be calculated by said calculation unit using the image coordinates extracted by said first extraction unit and the position of the first index calculated by said second unit.

9. The apparatus according to claim 1, wherein said calculation unit further comprises:
- a unit adapted to calculate first errors between image coordinates of the first index, which are calculated based on a current estimated value of the parameter to be calculated, and the image coordinates extracted by said first extraction unit;
- a unit adapted to calculate second errors between image coordinates of the second index, which are calculated based on a current estimated value of the parameter, and the image coordinates extracted by said second extraction unit; and
- a unit adapted to calculate the parameter using the first errors and the second errors.

10. An information processing apparatus comprising:
- a first acquisition unit adapted to acquire, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
- a first extraction unit adapted to extract image coordinates of the first index from each of the first images to acquire the image coordinates of the first index at the plurality of times;
- a second acquisition unit adapted to acquire a plurality of second images sensed by the second image sensing device at the plurality of times;
- a second extraction unit adapted to extract image coordinates of the second index from each of the second images to acquire the image coordinates of the second index at the plurality of times; and
- a calculation unit adapted to calculate a position of the second index by using simultaneously the image coordinates of the first index and the second index at the plurality of times, which are respectively extracted by said first extraction unit and said second extraction unit.

11. An information processing method comprising:
- a first acquisition step of acquiring, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
- a first extraction step of extracting image coordinates of the first index from each of the first images to acquire the image coordinates of the first index at the plurality of times;
- a second acquisition step of acquiring a plurality of second images sensed by the second image sensing device at the plurality of times;
- a second extraction step of extracting image coordinates of the second index from each of the second images to acquire the image coordinates of the second index at the plurality of times; and
- a calculation step of calculating a camera parameter of the first image sensing device by using simultaneously the image coordinates of the first index and the second index at the plurality of times, which are respectively extracted in the first extraction step and the second extraction step.

12. A computer-readable storage medium storing a computer program for making a computer execute an information processing method according to claim 11.

13. An information processing method comprising:
- a first acquisition step of acquiring, when a calibration jig which includes a second image sensing device for sensing a physical space on which a second index is allocated, and a first index allocated on the second image sensing device is moved within an image sensing range of a first image sensing device, a plurality of first images sensed by the first image sensing device at a plurality of times;
- a first extraction step of extracting image coordinates of the first index from each of the first images to acquire the image coordinates of the first index at the plurality of times;
- a second acquisition step of acquiring a plurality of second images sensed by the second image sensing device at the plurality of times;
- a second extraction step of extracting image coordinates of the second index from each of the second images to acquire the image coordinates of the second index at the plurality of times; and
- a calculation step of calculating a position of the second index by using simultaneously the image coordinates of the first index and the second index at the plurality of times, which are respectively extracted in the first extraction step and the second extraction step.

* * * * *